(12) United States Patent
Fang et al.

(10) Patent No.: US 9,960,674 B2
(45) Date of Patent: May 1, 2018

(54) SYSTEMS AND METHODS FOR OUTPUT CURRENT REGULATION IN POWER CONVERSION SYSTEMS

(71) Applicant: ON-BRIGHT ELECTRONICS (SHANGHAI) CO., LTD., Shanghai (CN)

(72) Inventors: Qian Fang, Shanghai (CN); Cong Lan, Shanghai (CN); Lieyi Fang, Shanghai (CN)

(73) Assignee: ON-BRIGHT ELECTRONICS (SHANGHAI) CO., LTD., Shanghai (CN)

(*) Notice: Subject to any disclaimer, the term of this patent is extended or adjusted under 35 U.S.C. 154(b) by 1 day.

(21) Appl. No.: 15/055,261

(22) Filed: Feb. 26, 2016

(65) Prior Publication Data
US 2016/0336868 A1  Nov. 17, 2016

Related U.S. Application Data

(63) Continuation of application No. 14/974,695, filed on Dec. 18, 2015, which is a continuation-in-part of application No. 14/753,079, filed on Jun. 29, 2015.

(30) Foreign Application Priority Data

May 15, 2015 (CN) ............ 2015 1 0249026
Nov. 17, 2015 (CN) ............ 2015 1 0788449

(51) Int. Cl.
*H02M 3/335* (2006.01)
*H02M 3/156* (2006.01)
*H02M 1/00* (2006.01)

(52) U.S. Cl.
CPC .... *H02M 3/156* (2013.01); *H02M 2001/0009* (2013.01)

(58) Field of Classification Search
CPC ............ H02M 3/33515; H02M 3/33507
(Continued)

(56) References Cited

U.S. PATENT DOCUMENTS 3,913,002 A    10/1975  Steigerwald et al.
3,967,173 A *   6/1976  Stich ............... H02P 27/08
                                                318/811
(Continued)

FOREIGN PATENT DOCUMENTS

CN      2552047 Y    5/2003
CN      1430314 A    7/2003
(Continued)

OTHER PUBLICATIONS

Chinese Patent Office, Office Action dated Nov. 2, 2016, in Application No. 201510249026.4.
(Continued)

*Primary Examiner* — Adolf Berhane
*Assistant Examiner* — Nusrat Quddus
(74) *Attorney, Agent, or Firm* — Faegre Baker Daniels LLP

(57) ABSTRACT

Systems and methods are provided for regulating a power converter. An example system controller includes: a driver configured to output a drive signal to a switch to affect a current flowing through an inductive winding of a power converter, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. One minus the duty cycle is equal to a parameter. The system controller is configured to keep a multiplication product of the duty cycle, the parameter and the duration of the on-time period approximately constant.

37 Claims, 11 Drawing Sheets

(58) Field of Classification Search
USPC .............. 363/21.12–21.18, 52, 53, 125–127
See application file for complete search history.

(56) References Cited

U.S. PATENT DOCUMENTS

| | | | |
|---|---|---|---|
| 4,356,542 A | 10/1982 | Bruckner et al. | |
| 4,952,853 A | 8/1990 | Archer | |
| 4,975,820 A | 12/1990 | Szepesi | |
| 5,416,689 A | 5/1995 | Silverstein et al. | |
| 5,442,538 A | 8/1995 | Ikeda et al. | |
| 5,550,702 A | 8/1996 | Schmidt et al. | |
| 5,574,392 A * | 11/1996 | Jordan | H03K 4/48 327/131 |
| 5,578,908 A | 11/1996 | Persson | |
| 5,796,595 A | 8/1998 | Cross | |
| 5,867,379 A | 2/1999 | Maksimovic et al. | |
| 5,917,714 A | 6/1999 | Ogawa | |
| 6,084,783 A | 7/2000 | Rascon Martinez et al. | |
| 6,292,376 B1 | 9/2001 | Kato | |
| 6,469,917 B1 | 10/2002 | Ben-Yaakov | |
| 6,515,876 B2 | 2/2003 | Koike et al. | |
| 6,611,439 B1 | 8/2003 | Yang et al. | |
| 6,714,425 B2 | 3/2004 | Yamada et al. | |
| 6,737,845 B2 * | 5/2004 | Hwang | H02M 1/0845 323/222 |
| 6,839,247 B1 | 1/2005 | Yang et al. | |
| 6,842,350 B2 | 1/2005 | Yamada et al. | |
| 6,903,536 B2 | 6/2005 | Yang | |
| 6,914,789 B2 | 7/2005 | Kinoshita et al. | |
| 6,947,298 B2 | 9/2005 | Uchida | |
| 6,954,367 B2 | 10/2005 | Yang et al. | |
| 7,027,313 B2 | 4/2006 | Amei | |
| 7,061,225 B2 | 6/2006 | Yang et al. | |
| 7,099,164 B2 | 8/2006 | Zhu et al. | |
| 7,149,098 B1 | 12/2006 | Chen | |
| 7,342,383 B1 * | 3/2008 | Song | H02M 3/1584 323/222 |
| 7,362,592 B2 | 4/2008 | Yang et al. | |
| 7,362,593 B2 | 4/2008 | Yang et al. | |
| 7,391,630 B2 | 6/2008 | Acatrinei | |
| 7,394,634 B2 | 7/2008 | Fang et al. | |
| 7,679,938 B2 | 3/2010 | Ye et al. | |
| 7,684,220 B2 | 3/2010 | Fang et al. | |
| 7,719,249 B2 * | 5/2010 | Matyas | H02M 1/36 323/285 |
| 7,738,227 B2 | 6/2010 | Fang et al. | |
| 7,746,615 B2 | 6/2010 | Zhu et al. | |
| 7,759,891 B2 | 7/2010 | Serizawa et al. | |
| 7,778,049 B2 | 8/2010 | Morota | |
| 7,791,903 B2 | 9/2010 | Zhang et al. | |
| 8,004,112 B2 | 8/2011 | Koga et al. | |
| 8,018,745 B2 | 9/2011 | Fang et al. | |
| 8,098,502 B2 | 1/2012 | Mao et al. | |
| 8,102,676 B2 | 1/2012 | Huyhn et al. | |
| 8,416,596 B2 | 4/2013 | Huang | |
| 8,482,946 B2 | 7/2013 | Fang et al. | |
| 8,488,342 B2 | 7/2013 | Zhang et al. | |
| 8,508,142 B2 * | 8/2013 | Lin | H05B 33/0815 315/200 A |
| 8,519,691 B2 * | 8/2013 | McCloy-Stevens | H02M 3/1588 323/284 |
| 8,559,152 B2 | 10/2013 | Cao et al. | |
| 8,680,884 B2 | 3/2014 | Chobot | |
| 8,824,167 B2 * | 9/2014 | Hughes | H02M 3/33507 323/282 |
| 8,824,173 B2 | 9/2014 | Fang et al. | |
| 8,917,527 B2 | 12/2014 | Fang et al. | |
| 9,088,218 B2 | 7/2015 | Zhang et al. | |
| 9,136,703 B2 | 9/2015 | Cummings | |
| 9,362,737 B2 * | 6/2016 | Yang | H02M 1/32 |
| 9,401,648 B2 | 7/2016 | Li | |
| 9,553,501 B2 | 1/2017 | Yao et al. | |
| 9,564,811 B2 | 2/2017 | Zhai et al. | |
| 9,570,986 B2 | 2/2017 | Zhai et al. | |
| 9,577,536 B2 | 2/2017 | Yang et al. | |
| 9,584,005 B2 | 2/2017 | Fang | |
| 9,647,448 B2 | 5/2017 | Fang et al. | |
| 2002/0131279 A1 | 9/2002 | Tang | |
| 2003/0099119 A1 | 5/2003 | Yamada et al. | |
| 2003/0156433 A1 | 8/2003 | Gong et al. | |
| 2003/0174520 A1 | 9/2003 | Bimbaud | |
| 2004/0201369 A1 | 10/2004 | Perrier et al. | |
| 2004/0218405 A1 | 11/2004 | Yamada et al. | |
| 2005/0036342 A1 | 2/2005 | Uchida | |
| 2005/0099164 A1 | 5/2005 | Yang | |
| 2006/0055433 A1 | 3/2006 | Yang et al. | |
| 2006/0291258 A1 | 12/2006 | Zhu et al. | |
| 2008/0198638 A1 | 8/2008 | Reinberger et al. | |
| 2008/0257397 A1 | 10/2008 | Glaser et al. | |
| 2008/0298099 A1 | 12/2008 | Huang et al. | |
| 2008/0309380 A1 | 12/2008 | Yang et al. | |
| 2008/0316781 A1 | 12/2008 | Liu | |
| 2009/0021233 A1 | 1/2009 | Hsu | |
| 2009/0128113 A1 * | 5/2009 | Ryoo | G05F 1/618 323/283 |
| 2009/0219070 A1 | 9/2009 | Zhang et al. | |
| 2010/0253250 A1 | 10/2010 | Marvelly et al. | |
| 2010/0328831 A1 | 12/2010 | Zhang et al. | |
| 2011/0101953 A1 | 5/2011 | Cheng et al. | |
| 2011/0110126 A1 | 5/2011 | Morrish | |
| 2011/0169418 A1 | 7/2011 | Yang et al. | |
| 2012/0008352 A1 | 1/2012 | Huang et al. | |
| 2012/0075891 A1 | 3/2012 | Zhang et al. | |
| 2012/0119650 A1 | 5/2012 | Lee | |
| 2012/0147630 A1 | 6/2012 | Cao et al. | |
| 2012/0194227 A1 | 8/2012 | Lin et al. | |
| 2012/0224397 A1 | 9/2012 | Yeh | |
| 2012/0281438 A1 | 11/2012 | Fang et al. | |
| 2013/0003421 A1 | 1/2013 | Fang | |
| 2013/0100715 A1 | 4/2013 | Lin et al. | |
| 2013/0135775 A1 | 5/2013 | Yao et al. | |
| 2013/0181635 A1 | 7/2013 | Ling | |
| 2013/0223107 A1 | 8/2013 | Zhang et al. | |
| 2013/0258723 A1 | 10/2013 | Fang et al. | |
| 2013/0294121 A1 | 11/2013 | Fang et al. | |
| 2013/0336029 A1 | 12/2013 | Cao et al. | |
| 2014/0016366 A1 | 1/2014 | Su | |
| 2014/0029315 A1 | 1/2014 | Zhang et al. | |
| 2015/0023069 A1 * | 1/2015 | Zhu | H02M 3/33507 363/21.16 |
| 2015/0055382 A1 * | 2/2015 | Yang | H02M 1/32 363/21.18 |
| 2015/0115919 A1 | 4/2015 | Yang et al. | |
| 2015/0180328 A1 | 6/2015 | Yao et al. | |
| 2015/0301542 A1 | 10/2015 | Yang et al. | |
| 2015/0303787 A1 | 10/2015 | Zhai et al. | |
| 2015/0303898 A1 | 10/2015 | Zhai et al. | |
| 2015/0340952 A1 | 11/2015 | Manohar et al. | |
| 2015/0340957 A1 | 11/2015 | Fang et al. | |
| 2015/0357912 A1 | 12/2015 | Perreault et al. | |
| 2016/0226239 A1 | 8/2016 | Yang et al. | |
| 2016/0336852 A1 | 11/2016 | Fang et al. | |
| 2016/0336864 A1 | 11/2016 | Fang et al. | |
| 2016/0336868 A1 * | 11/2016 | Fang | H02M 3/156 |
| 2017/0141688 A1 | 5/2017 | Zhai et al. | |
| 2017/0163026 A1 | 6/2017 | Yang et al. | |
| 2017/0179808 A1 | 6/2017 | Zhai et al. | |
| 2017/0187294 A1 | 6/2017 | Fang et al. | |
| 2017/0194869 A1 | 7/2017 | Yao et al. | |
| 2017/0214327 A1 | 7/2017 | Zhu et al. | |
| 2017/0214328 A1 | 7/2017 | Zhu et al. | |

FOREIGN PATENT DOCUMENTS

| | | |
|---|---|---|
| CN | 2567850 Y | 8/2003 |
| CN | 1448005 A | 10/2003 |
| CN | 1459903 A | 12/2003 |
| CN | 1497827 A | 5/2004 |
| CN | 1815838 A | 8/2006 |
| CN | 1917322 A | 2/2007 |
| CN | 101079576 A | 11/2007 |
| CN | 101295872 A | 10/2008 |
| CN | 101340149 A | 1/2009 |

(56) References Cited

FOREIGN PATENT DOCUMENTS

| | | |
|---|---|---|
| CN | 101499713 A | 8/2009 |
| CN | 101552570 | 10/2009 |
| CN | 100559678 C | 11/2009 |
| CN | 101662223 A | 3/2010 |
| CN | 101295872 B | 4/2010 |
| CN | 201477463 U | 5/2010 |
| CN | 101924536 A | 12/2010 |
| CN | 101964647 A | 2/2011 |
| CN | 101997412 A | 3/2011 |
| CN | 102202449 | 9/2011 |
| CN | 202009514 U | 10/2011 |
| CN | 102364990 A | 2/2012 |
| CN | 102412727 A | 4/2012 |
| CN | 102487246 A | 6/2012 |
| CN | 102545567 A | 7/2012 |
| CN | 102624237 A | 8/2012 |
| CN | 102625514 A | 8/2012 |
| CN | 102638169 A | 8/2012 |
| CN | 102651613 A | 8/2012 |
| CN | 102761255 A | 10/2012 |
| CN | 102790531 A | 11/2012 |
| CN | 102801300 A | 11/2012 |
| CN | 103036438 A | 4/2013 |
| CN | 103078489 | 5/2013 |
| CN | 103166198 | 6/2013 |
| CN | 103167665 A | 6/2013 |
| CN | 103178717 A | 6/2013 |
| CN | 103401424 A | 11/2013 |
| CN | 103781256 | 5/2014 |
| CN | 103781257 | 5/2014 |
| CN | 103887980 A | 6/2014 |
| CN | 103916027 A | 7/2014 |
| CN | 103956905 A | 7/2014 |
| CN | 203747681 | 7/2014 |
| CN | 103986336 A | 8/2014 |
| CN | 104022648 | 9/2014 |
| CN | 104617792 A | 5/2015 |
| CN | 104853493 A | 8/2015 |
| CN | 104967328 A | 10/2015 |
| EP | 0871328 B1 | 8/2003 |
| EP | 1317052 B1 | 10/2006 |
| JP | 2003-333839 A | 11/2003 |
| JP | 2006-237519 A | 9/2006 |
| JP | 2006-237619 A | 9/2006 |
| JP | 4064296 | 3/2008 |
| JP | 2009-36750 A | 2/2009 |
| TW | 200929824 | 7/2009 |
| TW | M400069 | 3/2011 |
| TW | 201117670 | 5/2011 |
| TW | 201218860 | 5/2012 |
| TW | 201225495 | 6/2012 |
| TW | 201241591 | 10/2012 |
| TW | 201325304 | 6/2013 |
| TW | I403875 | 8/2013 |
| TW | I434500 | 4/2014 |
| TW | 201429132 | 7/2014 |
| TW | I458232 | 10/2014 |
| TW | 201541845 | 11/2015 |
| WO | WO 2012/147453 | 11/2012 |

OTHER PUBLICATIONS

United States Patent and Trademark, Notice of Allowance dated Sep. 14, 2016, in U.S. Appl. No. 13/749,516.
United States Patent and Trademark, Notice of Allowance dated Sep. 28, 2016, in U.S. Appl. No. 13/900,430.
United States Patent and Trademark, Notice of Allowance dated Sep. 12, 2016, in U.S. Appl. No. 14/272,323.
United States Patent and Trademark, Notice of Allowance dated Sep. 29, 2016, in U.S. Appl. No. 14/639,607.
United States Patent and Trademark, Notice of Allowance dated Sep. 9, 2016, in U.S. Appl. No. 14/334,553.
United States Patent and Trademark, Notice of Allowance dated Sep. 26, 2016, in U.S. Appl. No. 13/967,276.
United States Patent and Trademark, Notice of Allowance dated Oct. 12, 2016, in U.S. Appl. No. 14/817,081.
United States Patent and Trademark, Notice of Allowance dated Nov. 22, 2016, in U.S. Appl. No. 13/969,281.
United States Patent and Trademark, Notice of Allowance dated Feb. 23, 2017, in U.S. Appl. No. 14/753,079.
Taiwan Intellectual Property Office, Office Action dated May 18, 2016, in Application No. 103121063.
Taiwan Intellectual Property Office, Office Action dated May 24, 2016, in Application No. 104110694.
Taiwan Intellectual Property Office, Office Action dated May 23, 2016, in Application No. 104132444.
Taiwan Intellectual Property Office, Approval Report dated May 26, 2016, in Application No. 104125785.
United Stated Patent and Trademark, Notice of Allowance dated Jun. 24, 2016, in U.S. Appl. No. 13/749,516.
United Stated Patent and Trademark, Notice of Allowance dated Jul. 11, 2016, in U.S. Appl. No. 13/900,430.
United Stated Patent and Trademark, Notice of Allowance dated Jul. 14, 2016, in U.S. Appl. No. 14/272,323.
United Stated Patent and Trademark, Notice of Allowance dated Jul. 27, 2016, in U.S. Appl. No. 14/639,607.
United Stated Patent and Trademark, Notice of Allowance dated May 26, 2016, in U.S. Appl. No. 14/334,553.
United Stated Patent and Trademark, Notice of Allowance dated May 27, 2016, in U.S. Appl. No. 13/967,276.
United Stated Patent and Trademark, Office Action dated May 24, 2016, in U.S. Appl. No. 13/969,281.
United Stated Patent and Trademark, Office Action dated Jul. 12, 2016, in U.S. Appl. No. 14/753,079.
Chinese Patent Office, Office Action dated Aug. 1, 2014, in Application No. 201310015152.4.
Chinese Patent Office, Office Action dated Jan. 17, 2014, in Application No. 201310306106.X.
Chinese Patent Office, Office Action dated Jan. 3, 2014, in Application No. 201010587658.9.
Chinese Patent Office, Office Action dated Nov. 26, 2015, in Application No. 201410134395.4.
Chinese Patent Office, Office Action dated Dec. 4, 2015, in Application No. 201410198140.4.
Chinese Patent Office, Office Action dated Jan. 25, 2016, in Application No. 201410157557.6.
Taiwan Intellectual Property Office, Office Action dated Mar. 13, 2014, in Application No. 100101960.
Taiwan Intellectual Property Office, Office Action dated May 5, 2015, in Application No. 102131370.
United Stated Patent and Trademark, Notice of Allowance dated Nov. 13, 2015, in U.S. Appl. No. 13/749,516.
United Stated Patent and Trademark, Notice of Allowance dated Mar. 16, 2016, in U.S. Appl. No. 13/749,516.
United Stated Patent and Trademark, Notice of Allowance dated Nov. 6, 2015, in U.S. Appl. No. 13/900,430.
United Stated Patent and Trademark, Notice of Allowance dated Mar. 21, 2016, in U.S. Appl. No. 13/900,430.
United Stated Patent and Trademark, Notice of Allowance dated Jan. 20, 2016, in U.S. Appl. No. 14/334,553.
United Stated Patent and Trademark, Notice of Allowance dated Feb. 23, 2016, in U.S. Appl. No. 14/334,553.
United Stated Patent and Trademark, Office Action dated Jun. 17, 2015, in U.S. Appl. No. 13/749,516.
United Stated Patent and Trademark, Office Action dated Mar. 9, 2015, in U.S. Appl. No. 13/967,276.
United Stated Patent and Trademark, Office Action dated May 14, 2015, in U.S. Appl. No. 13/900,430.
United Stated Patent and Trademark, Office Action dated Oct. 13, 2015, in U.S. Appl. No. 13/967,276.
United Stated Patent and Trademark, Office Action dated Oct. 30, 2015, in U.S. Appl. No. 13/969,281.
United Stated Patent and Trademark, Office Action dated Jan. 5, 2016, in U.S. Appl. No. 14/272,323.
Chinese Patent Office, Office Action dated Aug. 17, 2016, in Application No. 201510053255.9.

(56) References Cited

OTHER PUBLICATIONS

Taiwan Intellectual Property Office, Office Action dated Jul. 29, 2016, in Application No. 105106390.
Chinese Patent Office, Office Action dated Aug. 31, 2017, in Application No. 201510249026.4.
United States Patent and Trademark, Notice of Allowance dated Sep. 6, 2017, in U.S. Appl. No. 14/753,079.
United States Patent and Trademark, Notice of Allowance dated Sep. 6, 2017, in U.S. Appl. No. 14/974,695.
United States Patent and Trademark, Office Action dated Aug. 24, 2017, in U.S. Appl. No. 15/371,058.
United States Patent and Trademark, Office Action dated Oct. 5, 2017, in U.S. Appl. No. 15/374,896.
United States Patent and Trademark, Office Action dated Nov. 8, 2017, in U.S. Appl. No. 15/380,693.
United States Patent and Trademark, Office Action dated Oct. 23, 2017, in U.S. Appl. No. 15/400,469.
United States Patent and Trademark, Office Action dated Sep. 19, 2017, in U.S. Appl. No. 15/428,996.
Chinese Patent Office, Office Action dated Apr. 5, 2017, in Application No. 201510413940.8.
Chinese Patent Office, Office Action dated Jun. 21, 2017, in Application No. 201510788449.3.
United States Patent and Trademark, Notice of Allowance dated Jun. 1, 2017, in U.S. Appl. No. 14/753,079.
United States Patent and Trademark, Notice of Allowance dated Jun. 23, 2017, in U.S. Appl. No. 14/974,694.
United States Patent and Trademark, Office Action dated Jun. 28, 2017, in U.S. Appl. No. 14/638,191.
United States Patent and Trademark, Office Action dated Jul. 25, 2017, in U.S. Appl. No. 15/362,268.
United States Patent and Trademark, Office Action dated Jan. 24, 2018, in U.S. Appl. No. 15/428,996.

* cited by examiner

SYSTEMS AND METHODS FOR OUTPUT CURRENT REGULATION IN POWER CONVERSION SYSTEMS

1. CROSS-REFERENCES TO RELATED APPLICATIONS

This application is a continuation of U.S. patent application Ser. No. 14/974,695, filed Dec. 18, 2015, which claims priority to Chinese Patent Application No. 201510788449.3, filed Nov. 17, 2015, both of these applications being incorporated by reference herein for all purposes. In addition, U.S. patent application Ser. No. 14/974,695 is a continuation-in-part of U.S. patent application Ser. No. 14/753,079, filed Jun. 29, 2015, claiming priority to Chinese Patent Application No. 201510249026.4, filed May 15, 2015, all of these applications being incorporated by reference herein for all purposes.

2. BACKGROUND OF THE INVENTION

Certain embodiments of the present invention are directed to integrated circuits. More particularly, some embodiments of the invention provide systems and methods for regulating output currents. Merely by way of example, some embodiments of the invention have been applied to power conversion systems. But it would be recognized that the invention has a much broader range of applicability.

Light emitting diodes (LEDs) are widely used for lighting applications. Oftentimes, approximately constant currents are used to control working currents of LEDs to achieve constant brightness. FIG. 1 is a simplified diagram showing a conventional LED lighting system. The LED lighting system 100 includes a controller 102, resistors 108, 116, 122, 124 and 128, capacitors 106, 110, 112 and 130, a full-wave rectifying component 104, diodes 114 and 118, an inductive component 126 (e.g., an inductor), and a Zener diode 120. The controller 102 includes terminals (e.g., pins) 138, 140, 142, 144, 146 and 148.

An alternate-current (AC) voltage 150 is applied to the system 100. The rectifying component 104 provides an input voltage 152 (e.g., a rectified voltage no smaller than 0 V) associated with the AC voltage 150. The capacitor 112 (e.g., C3) is charged in response to the input voltage 152 through the resistor 108 (e.g., R1), and a voltage 154 is provided to the controller 102 at the terminal 148 (e.g., terminal VDD). If the voltage 154 is larger than a threshold voltage (e.g., an under-voltage lock-out threshold) in magnitude, the controller 102 begins to operate, and a voltage associated with the terminal 148 (e.g., terminal VDD) is clamped to a predetermined voltage. The terminal 138 (e.g., terminal DRAIN) is connected to a drain terminal of an internal power switch. The controller 102 outputs a drive signal (e.g., a pulse-width-modulation signal) with a certain frequency and a certain duty cycle to close (e.g., turn on) or open (e.g., turn off) the internal power switch so that the system 100 operates normally.

If the internal power switch is closed (e.g., being turned on), the controller 102 detects the current flowing through one or more LEDs 132 through the resistor 122 (e.g., R2). Specifically, a voltage 156 on the resistor 122 (e.g., R2) is passed through the terminal 144 (e.g., terminal CS) to the controller 102 for signal processing during different switching periods associated with the internal power switch. When the internal power switch is opened (e.g., being turned off) during each switching period is affected by peak magnitudes of the voltage 156 on the resistor 122 (e.g., R2).

The inductive component 126 is connected with the resistors 124 and 128 which generate a feedback signal 158. The controller 102 receives the feedback signal 158 through the terminal 142 (e.g., terminal FB) for detection of a demagnetization process of the inductive component 126 to determine when the internal power switch is closed (e.g., being turned on). The capacitor 110 (e.g., C2) is connected to the terminal 140 (e.g., terminal COMP) which is associated with an internal error amplifier. The capacitor 130 (e.g., C4) is configured to maintain an output voltage 196 to keep stable current output for the one or more LEDs 132. A power supply network including the resistor 116 (e.g., R5), the diode 118 (e.g., D2) and the Zener diode 120 (e.g., ZD1) provides power supply to the controller 102.

FIG. 2 is a simplified conventional diagram showing the system controller 102 as part of the system 100. The system controller 102 includes a ramp-signal generator 202, an under-voltage lock-out (UVLO) component 204, a comparator 206, a logic controller 208, a driving component 210 (e.g., a gate driver), a power switch 282, a demagnetization detector 212, an error amplifier 216, and a current-sensing component 214. For example, the power switch 282 includes a bipolar junction transistor. In another example, the power switch 282 includes a MOS transistor. In yet another example, the power switch 282 includes an insulated-gate bipolar transistor.

As shown in FIG. 2, the UVLO component 204 detects the signal 154 and outputs a signal 218. If the signal 154 is larger than a first predetermined threshold in magnitude, the system controller 102 begins to operate normally. If the signal 154 is smaller than a second predetermined threshold in magnitude, the system controller 102 is turned off. The second predetermined threshold is smaller than or equal to the first predetermined threshold in magnitude. The error amplifier 216 receives a signal 220 from the current-sensing component 214 and a reference signal 222 and outputs an amplified signal 224 to the comparator 206. The comparator 206 also receives a signal 228 from the ramp-signal generator 202 and outputs a comparison signal 226. For example, the signal 228 is a ramping signal and increases, linearly or non-linearly, to a peak magnitude during each switching period. The logic controller 208 processes the comparison signal 226 and outputs a modulation signal 230 to the driving component 210 which generates a drive signal 280 to open or close the switch 282 (e.g., at the gate terminal). The switch 282 is coupled between the terminal 138 (e.g., terminal DRAIN) and the terminal 144 (e.g., terminal CS). In addition, the logic controller 208 outputs the modulation signal 230 to the current-sensing component 214. For example, the demagnetization detector 212 detects the feedback signal 158 for determining the beginning and/or the end of a demagnetization process of the inductive component 126 and outputs a trigger signal 298 to the logic controller 208 to start a next cycle. The system controller 102 is configured to keep an on-time period associated with the comparison signal 226 approximately constant for a given output load so as to achieve high power factor and low total harmonic distortion.

The system controller 102 is operated in a voltage-mode where, for example, the signal 224 from the error amplifier 216 and the signal 228 from the oscillator 202 are both voltage signals and are compared by the comparator 206 to generate the comparison signal 226 to drive the power switch 282. Therefore, an on-time period associated with the power switch 282 is affected by the signal 224 and the signal 228.

Under stable normal operations, an average output current is determined, according to the following equation (e.g., without taking into account any error current):

$$\overline{I_o} = \frac{V_{ref\_ea}}{R_{cs}} \quad \text{(Equation 1)}$$

where $V_{ref\_ea}$ represents the reference signal 222 and $R_{cs}$ represents the resistance of the resistor 122. As shown in Equation 1, the parameters associated with peripheral components, such as $R_{cs}$, can be properly selected through system design to achieve output current regulation.

For LED lighting, efficiency, power factor and total harmonic are also important. For example, efficiency is often needed to be as high as possible (e.g., >90%), and a power factor is often needed to be greater than 0.9. Moreover, total harmonic distortion is often needed to be as low as possible (e.g., <20%) for some applications. But the system 100 often cannot satisfy all these needs.

Hence it is highly desirable to improve the techniques of regulating output currents of power conversion systems.

3. BRIEF SUMMARY OF THE INVENTION

Certain embodiments of the present invention are directed to integrated circuits. More particularly, some embodiments of the invention provide systems and methods for regulating output currents. Merely by way of example, some embodiments of the invention have been applied to power conversion systems. But it would be recognized that the invention has a much broader range of applicability.

According to one embodiment, a system controller includes: a driver configured to output a drive signal to a switch to affect a current flowing through an inductive winding of a power converter, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. One minus the duty cycle is equal to a parameter. The system controller is configured to keep a multiplication product of the duty cycle, the parameter and the duration of the on-time period approximately constant.

According to another embodiment, a system controller for regulating a power conversion system includes: a ramp-current generator configured to receive a modulation signal and generate a ramp current based at least in part on the modulation signal; a ramp-signal generator configured to receive the ramp current and generate a ramping signal based at least in part on the ramp current; a modulation component configured to receive the ramping signal and generate the modulation signal based at least in part on the ramping signal; and a driver configured to generate a drive signal based on at least information associated with the modulation signal and output the drive signal to a switch to affect a first current flowing through an inductive winding of a power converter, the drive signal being associated with a switching period including an on-time period and an off-time period. The switch is closed in response to the drive signal during the on-time period, and the switch is opened in response to the drive signal during the off-time period. A duty cycle is equal to a duration of the on-time period divided by a duration of the switching period. One minus the duty cycle is equal to a parameter. The ramp-current generator is further configured to generate the ramp current approximately proportional in magnitude to a multiplication product of the duty cycle and the parameter.

According to yet another embodiment, a system controller for regulating a power conversion system includes: a first controller terminal configured to provide a compensation signal based on at least information associated with a first current flowing through an inductive winding of a power converter; a ramp-current generator configured to receive a modulation signal, the compensation signal and a first reference signal and generate a ramp current based at least in part on the modulation signal, the compensation signal and the first reference signal; a ramp-signal generator configured to receive the ramp current and generate a ramping signal based at least in part on the ramp current; a modulation component configured to receive the ramping signal and the compensation signal and generate the modulation signal based at least in part on the ramping signal and the compensation signal; and a driver configured to generate a drive signal based on at least information associated with the modulation signal and output the drive signal to a switch to affect the first current, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. One minus the duty cycle is equal to a parameter. The ramp-current generator is further configured to generate the ramp current approximately proportional in magnitude to a multiplication product of the duty cycle, the parameter and a difference, the difference representing the first reference signal minus the compensation signal in magnitude.

In one embodiment, a method for regulating a power conversion system includes: generating a drive signal associated with a switching period including an on-time period and an off-time period; and outputting the drive signal to a switch to affect a current flowing through an inductive component. The outputting the drive signal to the switch to affect the current includes: outputting the drive signal to close the switch during the on-time period; and outputting the drive signal to open the switch during the off-time period. A duty cycle is equal to a duration of the on-time period divided by a duration of the switching period. One minus the duty cycle is equal to a parameter. The generating the drive signal associated with the switching period includes keeping a multiplication product of the duty cycle, the parameter and the duration of the on-time period approximately constant.

In another embodiment, a method for regulating a power conversion system includes: receiving a modulation signal; generating a ramp current based at least in part on the modulation signal; receiving the ramp current; generating a ramping signal based at least in part on the ramp current; receiving the ramping signal; generating the modulation signal based at least in part on the ramping signal; receiving the modulation signal; generating a drive signal based at least in part on the modulation signal, the drive signal being associated with a switching period including an on-time period and an off-time period; and outputting the drive signal to a switch to affect a first current flowing through a primary winding of a power conversion system. The outputting the drive signal to the switch to affect the first current includes: outputting the drive signal to close the switch during the on-time period; and outputting the drive signal to open the switch during the off-time period. A duty cycle is equal to a duration of the on-time period divided by a duration of the switching period. A parameter is equal to one minus the duty cycle. The generating the ramp current based at least in part on the modulation signal includes generating the ramp current approximately proportional in magnitude to a multiplication product of the duty cycle and the parameter.

In yet another embodiment, a method for regulating a power conversion system includes: providing a compensation signal based on at least information associated with a first current flowing through a primary winding of a power conversion system; receiving a modulation signal, the compensation signal and a first reference signal; generating a ramp current based at least in part on the modulation signal, the compensation signal and the first reference signal; receiving the ramp current; generating a ramping signal based at least in part on the ramp current; receiving the ramping signal and the compensation signal; generating the modulation signal based at least in part on the ramping signal and the compensation signal; receiving the modulation signal; and outputting a drive signal to a switch to affect the first current, the drive signal being associated with a switching period including an on-time period and an off-time period. The outputting the drive signal to the switch to affect the first current includes: outputting the drive signal to close the switch during the on-time period; and outputting the drive signal to open the switch during the off-time period. A duty cycle is equal to a duration of the on-time period divided by a duration of the switching period. A parameter is equal to one minus the duty cycle. The generating the ramp current based at least in part on the modulation signal, the compensation signal and the first reference signal includes generating the ramp current approximately proportional in magnitude to a multiplication product of the duty cycle, the parameter and a difference, the different representing the first reference signal minus the compensation signal in magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide systems and methods for regulating output currents. Merely by way of example, some embodiments of the invention have been applied to power conversion systems. But it would be recognized that the invention has a much broader range of applicability.

Figure 1:
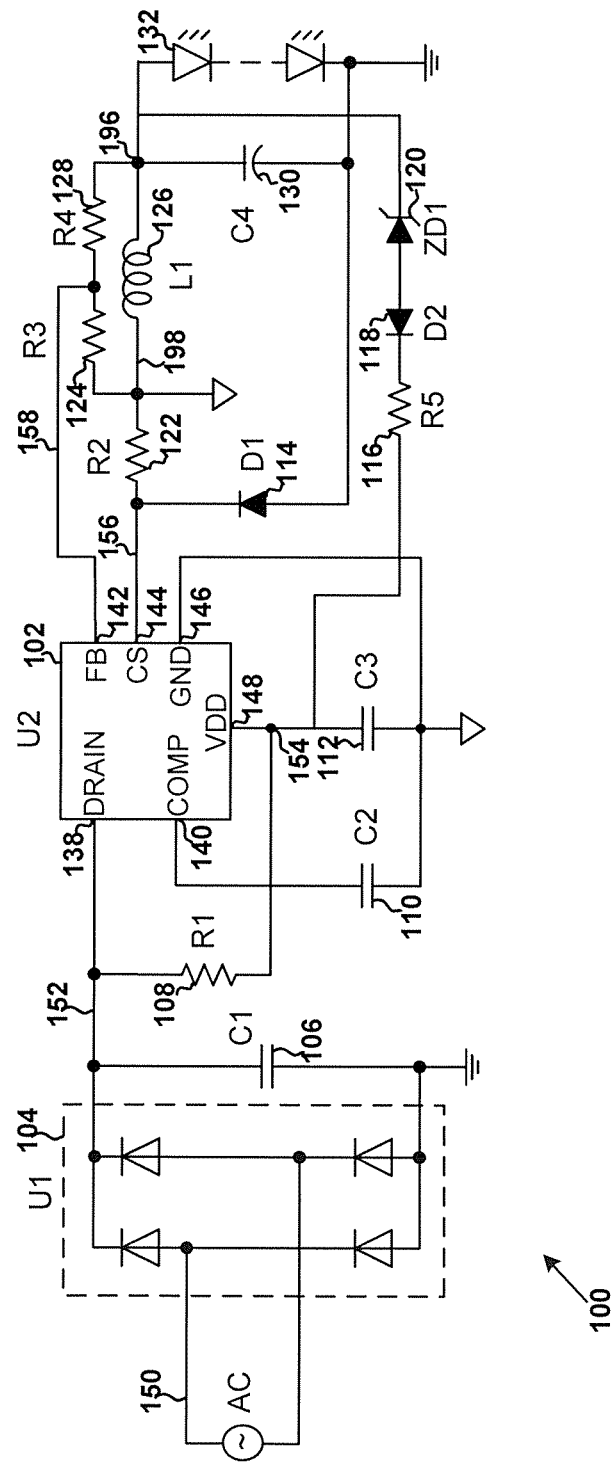
FIG. 1 is a simplified diagram showing a conventional LED lighting system.
Figure 2:
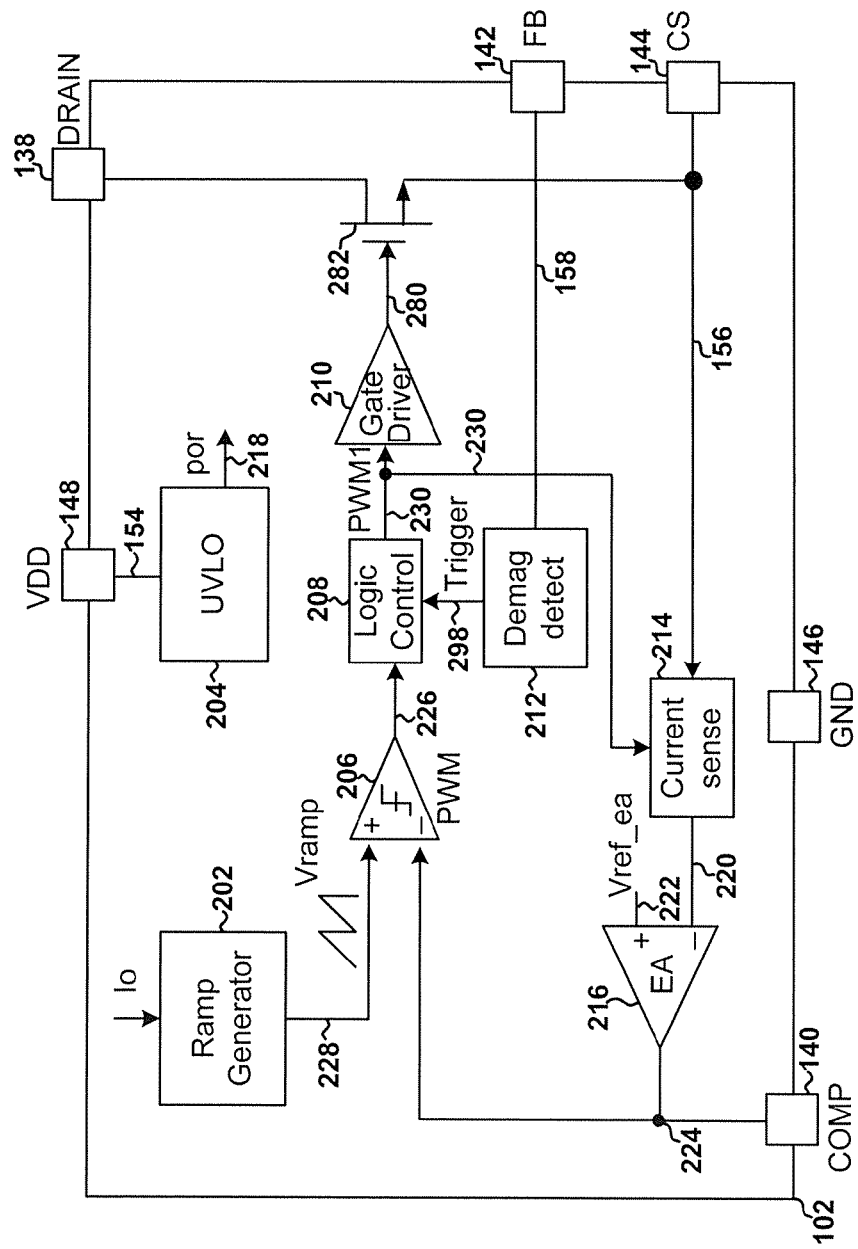
FIG. 2 is a simplified conventional diagram showing a system controller as part of the system as shown in FIG. 1.

Referring to FIG. 1, to achieve high efficiency (e.g., >90%), the system 100 may operate in a quasi-resonant (QR) mode, as an example. A peak value of the current 198 is determined as follows:

$$I_{in\_peak} = \left(\frac{T_{on}}{L_p}\right) \times (V_{in} - V_o) \quad \text{(Equation 2)}$$

where $I_{in\_peak}$ represents a peak value of a current 198 that flows through the inductive component 126, $T_{on}$ represents an on-time period during which the power switch 282 is closed (e.g., being turned on), and $V_{in}$ represents the input voltage 152. In addition, $V_o$ represents the output voltage 196, and $L_p$ represents the inductance of the inductive component 126.

For example, assuming the on-time period associated with the power switch 282 keeps approximately constant for a given input voltage and a given output load and the inductance of the inductive component 126 keeps approximately constant, the peak value of the current 198 follows the input voltage 152 (e.g., associated with a rectified sine waveform), according to Equation 2. An average of the current 198 is determined as follows:

$$I_{in\_ave} = \frac{1}{2} I_{in\_peak} \times D = \frac{(V_{in} - V_o) \times T_{on}}{2 \times L_p} \times D \quad \text{(Equation 3)}$$

where D represents a duty cycle associated with the power switch 282 and is determined as follows:

$$D = \frac{T_{on}}{T_{on} + T_{off}} \quad \text{(Equation 4)}$$

$T_{off}$ represents an off-time period during which the power switch 282 is opened (e.g., being turned off). For example, the average of the current 198 is an average value of the current 198 during one or more switching periods associated with the power switch 282, or is an average value of the current 198 during one or more switching periods associated with the power switch 282 that slide over time.

If the system 100 operates in the QR mode, the off-time period (e.g., $T_{off}$) is the same as a demagnetization period associated with a demagnetization process of the inductive component 126. Assuming the on-time period remains approximately constant in duration, the off-time period (e.g., $T_{off}$) changes with the peak value of the current 198 and thus the input voltage 152. As such, the switching period (e.g., $T_s$) changes with the input voltage 152. If the input voltage 152 increases in magnitude, the peak value of the current 198 increases and the switch period (e.g., $T_s$) increases in duration. As a result, the average of the current 198 does not follow closely the input voltage 152 and thus does not have a similar waveform as the input voltage 152 (e.g., a rectified sine waveform), which may result in poor total harmonic distortion.

Figure 3:
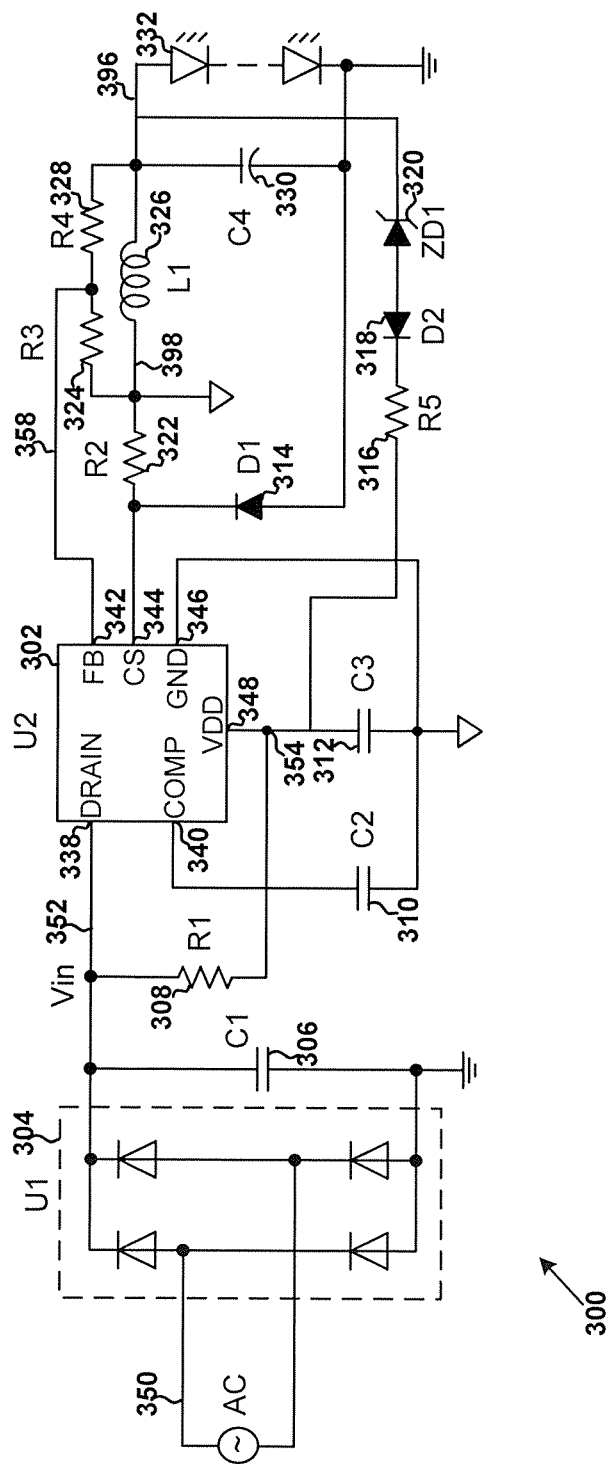
FIG. 3 is a simplified diagram showing a power conversion system according to an embodiment of the present invention.

FIG. 3 is a simplified diagram showing a power conversion system according to an embodiment of the present invention. This diagram is merely an example, which should not unduly limit the scope of the claims. One of ordinary skill in the art would recognize many variations, alternatives, and modifications. The power conversion system 300 (e.g., a power converter) includes a controller 302, resistors 308, 316, 322, 324 and 328, capacitors 306, 310, 312 and 330, a full-wave rectifying component 304 (e.g., a full-wave rectifier), diodes 314 and 318, an inductive component 326 (e.g., an inductive winding), and a Zener diode 320. The controller 302 includes terminals (e.g., pins) 338, 340, 342, 344, 346 and 348. For example, the system 400 operates in a quasi-resonant (QR) mode.

According to one embodiment, an alternate-current (AC) voltage 350 is applied to the system 300. For example, the rectifying component 304 provides an input voltage 352 (e.g., a rectified voltage no smaller than 0 V) associated with the AC voltage 350. In another example, the capacitor 312 (e.g., C3) is charged in response to the input voltage 352 through the resistor 308 (e.g., R1), and a voltage 354 is provided to the controller 302 at the terminal 348 (e.g., terminal VDD). In yet another example, if the voltage 354 is larger than a threshold voltage (e.g., an under-voltage lock-out threshold) in magnitude, the controller 302 begins to operate, and a voltage associated with the terminal 348 (e.g., terminal VDD) is clamped to a predetermined voltage. As an example, the terminal 338 (e.g., terminal DRAIN) is connected to a drain terminal of an internal switch (e.g., a power switch). As another example, the controller 302 outputs a drive signal (e.g., a pulse-width-modulation signal) with a certain frequency and a certain duty cycle to close (e.g., turn on) or open (e.g., turn off) the internal switch so that the system 300 operates normally.

According to another embodiment, if the internal switch is closed (e.g., being turned on), the controller 302 detects the current flowing through one or more LEDs 332 through the resistor 322 (e.g., R2). For example, a voltage 356 on the resistor 322 (e.g., R2) is passed through the terminal 344 (e.g., terminal CS) to the controller 302 for signal processing during different switching periods associated with the internal switch. As an example, when the internal switch is opened (e.g., being turned off) during each switching period is affected by peak magnitudes of the voltage 356 on the resistor 322 (e.g., R2).

According to yet another embodiment, the inductive component 326 is connected with the resistors 324 and 328 which generate a feedback signal 358. For example, the controller 302 receives the feedback signal 358 through the terminal 342 (e.g., terminal FB) for detection of a demagnetization process of the inductive component 326 to determine when the internal switch is closed (e.g., being turned on). In another example, the capacitor 310 (e.g., C2) is connected to the terminal 340 (e.g., terminal COMP) which is associated with an internal error amplifier. In yet another example, the capacitor 330 (e.g., C4) is configured to maintain an output voltage 396 to keep stable current output for the one or more LEDs 332. As an example, a power supply network including the resistor 316 (e.g., R5), the diode 318 (e.g., D2) and the Zener diode 320 (e.g., ZD1) provides power supply to the controller 302.

In one embodiment, an average of a current 398 that flows through the inductive component 326 is determined as follows:

$$I_{in\_ave} = \frac{1}{2} I_{in\_peak} \times D = \frac{(V_{in} - V_o) \times T_{on}}{2 \times L_p} \times D \quad \text{(Equation 5)}$$

where $I_{in\_peak}$ represents a peak value of the current 398, $T_{on}$ represents an on-time period during which the internal switch is closed (e.g., being turned on), and $V_{in}$ represents the input voltage 352. In addition, $V_o$ represents the output voltage 396, $L_p$ represents the inductance of the inductive component 326, and D represents a duty cycle associated with the internal switch. For example, D is determined as follows:

$$D = \frac{T_{on}}{T_{on} + T_{off}} \quad \text{(Equation 6)}$$

where $T_{off}$ represents an off-time period during which the internal switch is opened (e.g., being turned off). For example, the average of the current 398 is an average value of the current 398 during one or more switching periods associated with the internal switch or is an average value of the current 398 during one or more switching periods associated with the internal switch that slide over time.

In another embodiment, the system 300 operates in the QR mode, and the following equation is satisfied during each cycle:

$$(V_{in} - V_o) \times T_{on} = V_o \times T_{off} \quad \text{(Equation 7)}$$

Thus, the average of the current 398 is determined as follows:

$$I_{in\_ave} = \frac{V_{in} \times (1 - D) \times D \times T_{on}}{2 \times L_p} \quad \text{(Equation 8)}$$

According to certain embodiments, the system controller 302 is implemented to keep a multiplication product $(1-D) \times D \times T_{on}$ related to the duty cycle and the duration of the on-time period constant to achieve low total harmonic distortion as follows:

$$(1-D) \times D \times T_{on} = \text{constant} \quad \text{(Equation 9)}$$

For example, according to Equation 8, if the multiplication product $(1-D) \times D \times T_{on}$ is kept constant, the average of the current 398 changes with the input voltage 352 (e.g., associated with a rectified sine waveform). As an example, the average of the current 398 during one or more switching periods of the internal switch increases in magnitude with the increasing input voltage 352 over time and decreases in magnitude with the decreasing input voltage 352 over time.

In some embodiments, the system controller 302 is implemented to keep a multiplication product $(1-D) \times D \times T_{on}$ related to the duty cycle and the duration of the on-time period approximately constant to achieve low total harmonic distortion as follows:

$$(1-D) \times D \times T_{on} \approx \text{constant} \quad \text{(Equation 10)}$$

For example, according to Equation 10, if the multiplication product $(1-D) \times D \times T_{on}$ is kept approximately constant, the average of the primary current 398 changes (e.g., approximately linearly) with the input voltage 352 (e.g., associated with a rectified sine waveform). In another example, as shown in Equation 10, the error range of the multiplication product $(1-D) \times D \times T_{on}$ being constant is ±5%. In yet another example, as shown in Equation 10, the error range of the multiplication product $(1-D) \times D \times T_{on}$ being constant is ±10%. In yet another example, as shown in Equation 10, the error range of the multiplication product $(1-D) \times D \times T_{on}$ being constant is ±15%. In yet another example, as shown in Equation 10, the error range of the multiplication product $(1-D) \times D \times T_{on}$ being constant is ±20%.

Figure 4A:
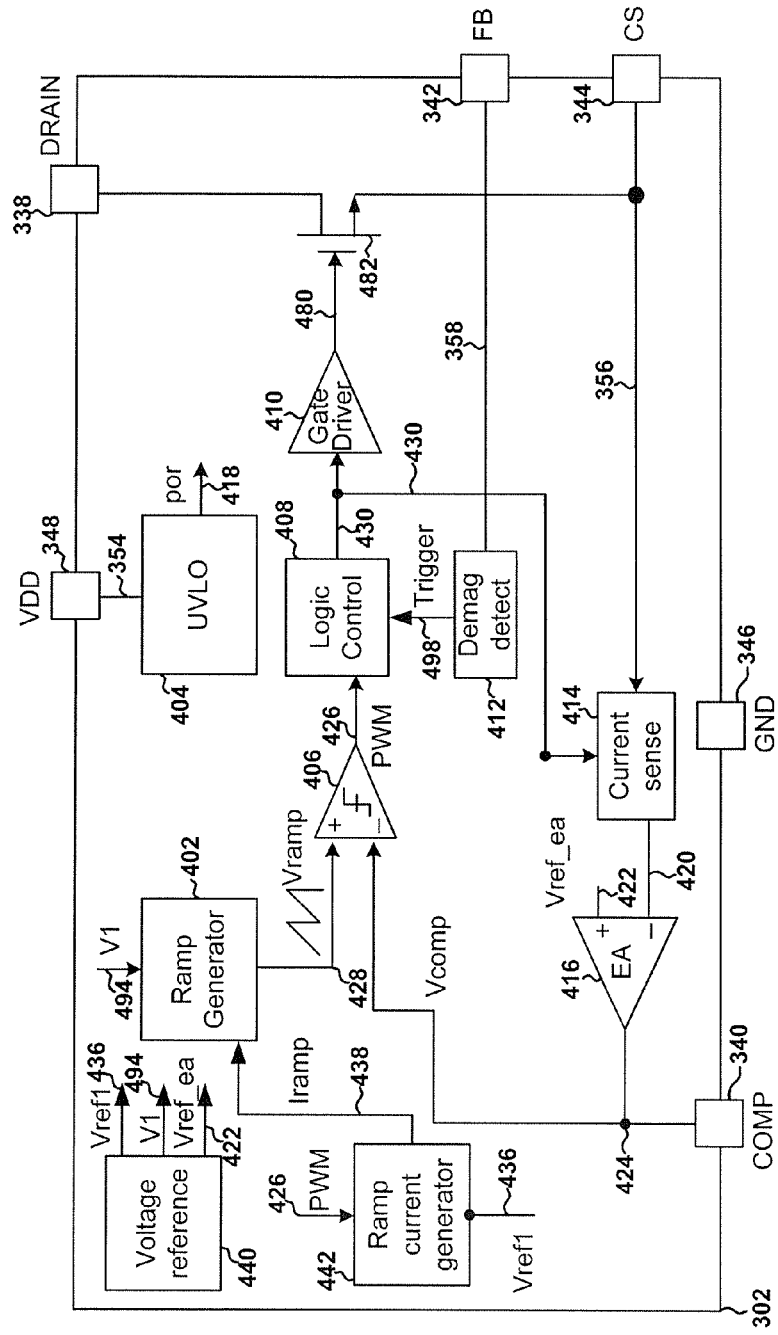
FIG. 4(A) is a simplified diagram showing a system controller as part of the power conversion system as shown in FIG. 3 according to an embodiment of the present invention.

FIG. 4(A) is a simplified diagram showing the system controller 302 as part of the power conversion system 300 according to an embodiment of the present invention. This diagram is merely an example, which should not unduly limit the scope of the claims. One of ordinary skill in the art would recognize many variations, alternatives, and modifications. The system controller 302 includes a ramp-signal generator 402, an under-voltage lock-out (UVLO) component 404 (e.g., a UVLO), a modulation component 406 (e.g., a comparator), a logic controller 408, a driving component 410 (e.g., a gate driver), a demagnetization detector 412, an error amplifier 416, a current-sensing component 414 (e.g., a current sensor), a reference-voltage generator 440, a switch 482 (e.g., a power switch), and a ramp-current generator 442. For example, the switch 482 includes a bipolar junction transistor. In another example, the switch 482 includes a MOS transistor. In yet another example, the switch 482 includes an insulated-gate bipolar transistor (IGBT).

According to one embodiment, the UVLO component 404 detects the signal 354 and outputs a signal 418 (e.g., por). For example, if the signal 354 is larger than a first predetermined threshold in magnitude, the system controller 302 begins to operate normally. If the signal 354 is smaller than a second predetermined threshold in magnitude, the system controller 302 is turned off. In another example, the second predetermined threshold is smaller than or equal to the first predetermined threshold in magnitude. In yet another example, the error amplifier 416 receives a signal 420 from the current-sensing component 414 and a reference signal 422. In yet another example, the error amplifier 416 generates a current which charges or discharges the capacitor 310 to generate a compensation signal 424. In yet another example, the compensation signal 424 is provided to the modulation component 406. In yet another example, the capacitor 310 is coupled to the terminal 340 (terminal COMP) and forms, together with the error amplifier 416, an integrator or a low pass filter. In yet another example, the error amplifier 416 is a transconductance amplifier and outputs a current which is proportional to a difference between the reference signal 422 and the signal 420. In yet another example, the error amplifier 416 together with the capacitor 310 generates the compensation signal 424 which is a voltage signal.

According to another embodiment, the reference-voltage generator 440 outputs a reference signal 436 (e.g., $V_{ref1}$) to the ramp-current generator 442, outputs a voltage signal 494 (e.g., V1) to the ramp-signal generator 402, and outputs a reference signal 422 (e.g., $V_{ref\_ea}$) to the error amplifier 416. In another example, the ramp-signal generator 402 also receives a current signal 438 (e.g., $I_{ramp}$) generated by the ramp-current generator 442 and generates a ramping signal 428. In yet another example, the current-sensing component 414 samples the voltage 356 in response to the control signal 430 and outputs the signal 420.

According to yet another embodiment, the current 438 (e.g., $I_{ramp}$) flows from the ramp-current generator 442 to the ramp-signal generator 402. For example, the current 438 (e.g., $I_{ramp}$) flows from the ramp-signal generator 402 to the ramp-current generator 442. In another example, the modulation component 406 receives the ramping signal 428 and outputs a modulation signal 426. In yet another example, the logic controller 408 processes the modulation signal 426 and outputs a control signal 430 to the current-sensing component 414 and the driving component 410. In yet another example, the modulation signal 426 corresponds to a pulse-width-modulation (PWM) signal. In yet another example, the driving component 410 generates a drive signal 480 to affect the switch 482. As an example, the switch 482 is coupled between the terminal 338 (e.g., terminal DRAIN) and the terminal 344 (e.g., terminal CS). In yet another example, the switch 482 is closed (e.g., being turned on) and opened (e.g., being turned off) at a switching frequency which corresponds to a switching period, where the switching period includes an on-time period during which the switch 482 is closed (e.g., being turned on) and an off-time period during which the switch 482 is opened (e.g., being turned off). As an example, a duty cycle (e.g., D) of the switch 482 is equal to the duration of the on-time period divided by the duration of the switching period. As another example, the demagnetization detector 412 detects the feedback signal 358 and outputs a trigger signal 498 to the logic controller 408 to start a next cycle (e.g., corresponding to a next switching period).

In one embodiment, the system controller 302 is configured to keep $(1-D) \times D \times T_{on}$ approximately constant so that the average of the current 398 follows the input voltage 352 to improve total harmonic distortion. Thus, $$D \times (1-D) \times T_{on} = \quad \text{(Equation 11)}$$
$$D \times (1-D) \times \frac{(V_{comp} - V1) \times C}{I_{ramp}} = \text{constant}$$

where $V_{comp}$ represents the compensation signal 424 (e.g., the output of the error amplifier 416), V1 represents the signal 494, $I_{ramp}$ represents the current 438, D represents the duty cycle of the switch 482 and C represents the capacitance of an internal capacitor in the ramp-signal generator 402. For example, the ramping signal 428 increases, linearly or non-linearly, to a peak magnitude during each switching period, and the signal 494 (e.g., V1) corresponds to a start point of the increase of the ramping signal 428.

To keep the multiplication product $(1-D) \times D \times T_{on}$ related to the duty cycle (e.g., D) and the duration of the on-time period (e.g., $T_{on}$) constant, the ramp-current generator 442 generates the current signal 438 (e.g., $I_{ramp}$) to be proportional in magnitude to $(1-D) \times D$, where D represents the duty cycle, according to some embodiments. For example, the current signal 438 (e.g., $I_{ramp}$) is determined as follows:

$$I_{ramp} = k_1 \times (1-D) \times D \quad \text{(Equation 12)}$$

where $k_1$ represents a coefficient parameter (e.g., a constant).

In some embodiments, the ramp-current generator 442 generates the current signal 438 to be approximately proportional in magnitude to $(1-D) \times D$ so that the multiplication product $(1-D) \times D \times T_{on}$ related to the duty cycle (e.g., D) and the duration of the on-time period (e.g., $T_{on}$) is kept approximately constant. For example, the current 438 (e.g., $I_{ramp}$) is determined as follows:

$$I_{ramp} \approx k_1 \times (1-D) \times D \quad \text{(Equation 13)}$$

where $k_1$ represents a coefficient parameter (e.g., a constant). In another example, as shown in Equation 13, the error range of the current signal 438 being proportional in magnitude to $(1-D) \times D$ is ±5%. In yet another example, as shown in Equation 13, the error range of the current signal 438 being proportional in magnitude to $(1-D) \times D$ is ±10%. In yet another example, as shown in Equation 13, the error range of the current signal 438 being proportional in magnitude to $(1-D) \times D$ is ±15%. In yet another example, as shown in Equation 13, the error range of the current signal 438 being proportional in magnitude to $(1-D) \times D$ is ±20%.

As discussed above and further emphasized here, FIG. 4(A) is merely an example, which should not unduly limit the scope of the claims. One of ordinary skill in the art would recognize many variations, alternatives, and modifications. For example, instead of receiving the modulation signal 426, the ramp-current generator 442 receives the signal 480. In another example, instead of receiving the modulation signal 426, the ramp-current generator 442 receives a demagnetization signal generated by the demagnetization detector 412. In yet another example, instead of receiving the modulation signal 426, the ramp-current generator 442 receives a signal complementary to the demagnetization signal generated by the demagnetization detector 412. In some embodiments, the system controller 302 is a chip. For example, the switch 482 is on the chip. In another example, the switch 482 is off the chip. In certain embodiments, the switch 482 is connected between the terminal 338 (e.g., terminal DRAIN) and the terminal 344 (e.g., terminal CS), but is located outside the system controller 302.

Figure 4B:
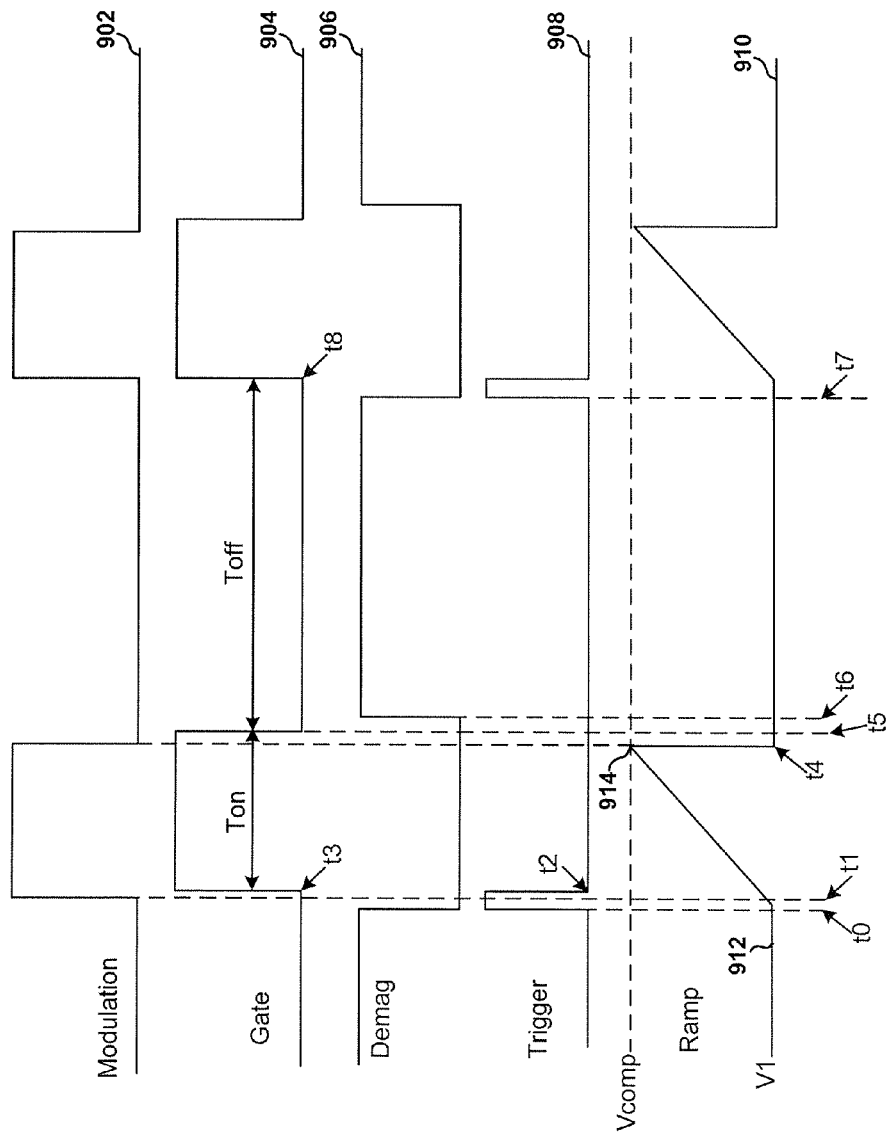
FIG. 4(B) is a simplified timing diagram for a system controller as part of the power conversion system as shown in FIG. 3 according to an embodiment of the present invention.

FIG. 4(B) is a simplified timing diagram for the system controller 302 as part of the power conversion system 300 according to an embodiment of the present invention. This diagram is merely an example, which should not unduly limit the scope of the claims. One of ordinary skill in the art would recognize many variations, alternatives, and modifications. The waveform 902 represents the modulation signal 426 as a function of time, the waveform 904 represents the signal 480 as a function of time, the wave form 906 represents a demagnetization signal generated by the demagnetization detector 412 as a function of time, the waveform 908 represents the trigger signal 498 as a function of time, and the waveform 910 represents the ramping signal 428 as a function of time.

An on-time period and an off-time period associated with the signal 480 are shown in FIG. 4(B). The on-time period begins at a time $t_3$ and ends at a time $t_5$, and the off-time period begins at the time $t_5$ and ends at a time $t_8$. For example, $t_0 \leq t_1 < t_2 < t_3 < t_4 < t_5 < t_6 < t_7 < t_8$.

According to one embodiment, at $t_0$, the demagnetization signal generated by the demagnetization detector 412 changes from the logic low level to the logic high level. For example, the demagnetization detector 412 generates a pulse (e.g., between $t_0$ and $t_2$) in the trigger signal 498 to trigger a new cycle. As an example, the ramping signal 428 begins to increase from a magnitude 912 to a magnitude 914 (e.g., at $t_4$). In another example, at $t_1$, the signal 426 changes from the logic low level to the logic high level. After a short delay, the signal 480 changes (e.g., at $t_3$) from the logic low level to the logic high level, and in response the switch 482 is closed (e.g., being turned on). In yet another example, at $t_4$, the signal 426 changes from the logic high level to the logic low level, and the ramping signal 428 decreases from the magnitude 914 to the magnitude 912. After a short delay, the signal 480 changes (e.g., at $t_5$) from the logic high level to the logic low level, and in response, the switch 482 is open (e.g., being turned off). As an example, at $t_6$, the demagnetization signal generated by the demagnetization detector 412 changes from the logic low level to the logic high level which indicates a beginning of a demagnetization process. In another example, at $t_7$, the demagnetization signal generated by the demagnetization detector 412 changes from the logic high level to the logic low level which indicates the end of the demagnetization process. In yet another example, the demagnetization detector 412 generates another pulse in the trigger signal 498 to start a next cycle. In yet another example, the magnitude 912 of the ramping signal 428 is associated with the signal 494. In yet another example, the magnitude 914 of the ramping signal 428 is associated with the magnitude of the compensation signal 424.

Figure 4C:
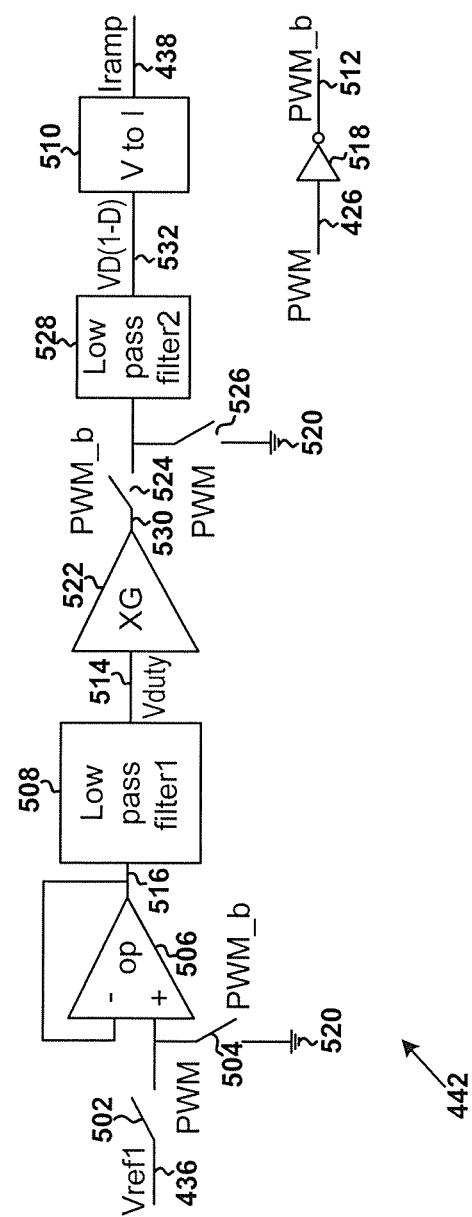
FIG. 4(C) is a simplified diagram showing a ramp-current generator as part of the system controller as shown in FIG. 4(A) according to one embodiment of the present invention.

FIG. 4(C) is a simplified diagram showing the ramp-current generator 442 as part of the system controller 302 according to one embodiment of the present invention. This diagram is merely an example, which should not unduly limit the scope of the claims. One of ordinary skill in the art would recognize many variations, alternatives, and modifications. The ramp-current generator 442 includes an operational amplifier 506, a low pass filter 508, a voltage-to-current converter 510, a NOT gate 518, a gain stage 522 (e.g., an amplifier), another low pass filter 528, and switches 502, 504, 524 and 526. As an example, the low pass filter 508 includes a RC filter which includes one or more resistors and one or more capacitors. As another example, the low pass filter 528 includes a RC filter which includes one or more resistors and one or more capacitors.

According to one embodiment, the switch 502 is closed or opened in response to the modulation signal 426 (e.g., PWM), and the switch 504 is closed or opened in response to a signal 512 (e.g., PWM_b). For example, the NOT gate 518 generates the signal 512 (e.g., PWM_b) which is complementary to the modulation signal 426 (e.g., PWM). As an example, if the modulation signal 426 is at the logic high level, the signal 512 is at the logic low level, and if the modulation signal 426 is at the logic low level, the signal 512 is at the logic high level.

According to another embodiment, if the modulation signal 426 (e.g., PWM) is at the logic high level, the switch 502 is closed (e.g., being turned on) and the operational amplifier 506 receives the reference signal 436 (e.g., $V_{ref1}$) at its non-inverting terminal (e.g., terminal "+"), where the inverting terminal (e.g., terminal "−") and the output terminal of the amplifier 506 are connected. For example, the operational amplifier 506 includes a buffer amplifier with a gain of 1. As an example, the signal 512 is at the logic low level, and the switch 504 is open (e.g., being turned off). For example, the low pass filter 508 receives a signal 516 from the amplifier 506 and outputs a filtered signal 514 (e.g., $V_{duty}$). In another example, the filtered signal 514 (e.g., $V_{duty}$) is a voltage signal and is received by the gain stage 522 (e.g., including an amplifier with a gain of G) which generates an amplified signal 530. As an example, the gain stage 522 includes an amplifier with a gain larger than 1. As another example, the signal 516 is approximately equal (e.g., in magnitude) to the reference signal 436. As yet another example, the gain stage 522 includes an amplifier with a gain equal to 1. In some embodiments, the operational amplifier 506 is omitted.

According to yet another embodiment, if the modulation signal 426 (e.g., PWM) is at the logic low level and the signal 512 is at the logic high level, the switch 502 is open (e.g., being turned off), and the switch 504 is closed (e.g., being turned on). For example, the operational amplifier 506 receives a ground voltage 520 at its non-inverting terminal (e.g., terminal "+"), and changes the signal 516. As an example, the signal 516 is approximately equal to the ground voltage 520.

In one embodiment, the switch 524 is closed or opened in response to the signal 512 (e.g., PWM_b), and the switch 526 is closed or opened in response to the modulation signal 426 (e.g., PWM). For example, if the modulation signal 426 (e.g., PWM) is at the logic low level, the signal 512 (e.g., PWM_b) is at the logic high level. In response, the switch 524 is closed (e.g., being turned on) and the switch 526 is opened (e.g., being turned off). As an example, the low pass filter 528 receives the amplified signal 530 and outputs a filtered signal 532 (e.g., $V_{D(1-D)}$). As another example, the filtered signal 532 (e.g., $V_{D(1-D)}$) is a voltage signal and is converted by the voltage-to-current converter 510 to the current 438 (e.g., $I_{ramp}$).

In another embodiment, if the modulation signal 426 (e.g., PWM) is at the logic high level and the signal 512 is at the logic low level, the switch 524 is open (e.g., being turned off), and the switch 526 is closed (e.g., being turned on). For example, the low pass filter 528 receives the ground voltage 520 and changes the filtered signal 532. As an example, the signal 516 is approximately equal to the ground voltage 520.

In yet another embodiment, the current 438 (e.g., $I_{ramp}$) is determined as follows:

$$I_{ramp} = \alpha \times V_{ref1} \times D \times (1-D) \quad \text{(Equation 14)}$$

where $V_{ref1}$ represents the reference signal 436, α represents a coefficient parameter (e.g., a constant), and D represents the duty cycle of the switch 482.

Figure 4D:
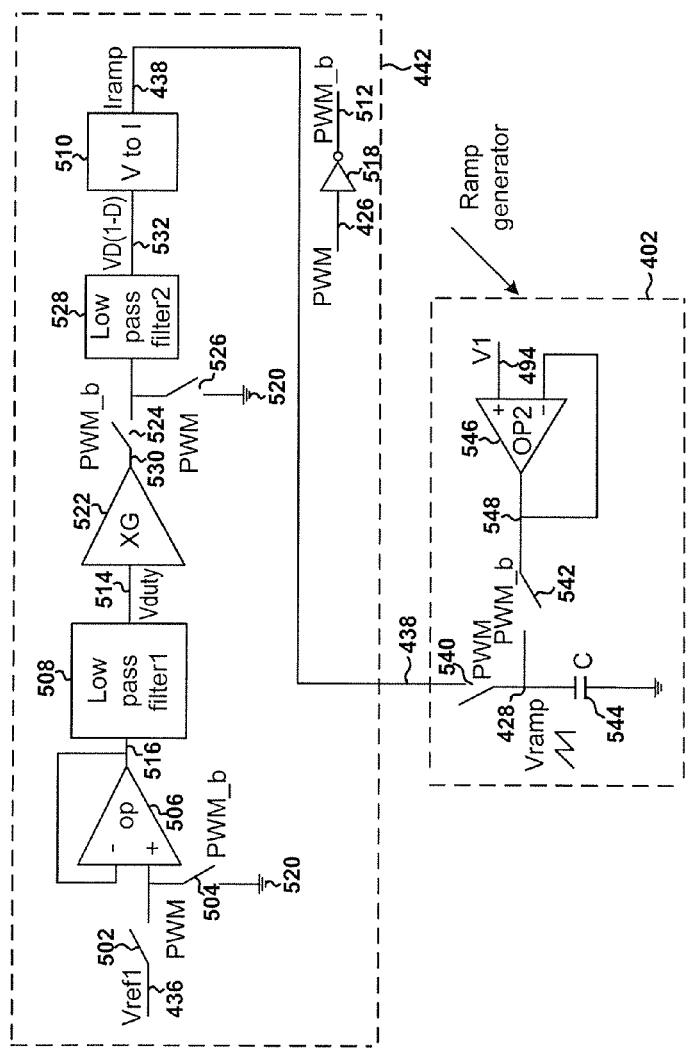
FIG. 4(D) is a simplified diagram showing a ramp-current generator and a ramp-signal generator as parts of the system controller as shown in FIG. 4(A) according to some embodiments of the present invention.

FIG. 4(D) is a simplified diagram showing the ramp-current generator 442 and the ramp-signal generator 402 as parts of the system controller 302 according to some embodiments of the present invention. This diagram is merely an example, which should not unduly limit the scope of the claims. One of ordinary skill in the art would recognize many variations, alternatives, and modifications. The ramp-signal generator 402 includes an operational amplifier 546, switches 540 and 542, and a capacitor 544. For example, the switches 502, 504, 524, 526, 540 and 532 each include one or more MOS transistors.

According to one embodiment, the switch 540 is closed or opened in response to the modulation signal 426 (e.g., PWM), and the switch 542 is closed or opened in response to the signal 512 (e.g., PWM_b). In one embodiment, if the modulation signal 426 (e.g., PWM) is at the logic low level and the signal 512 is at the logic high level, the switch 540 is open (e.g., being turned off) and the switch 504 is closed (e.g., being turned on). For example, the operational amplifier 546 receives the signal 494 (e.g., V1) at its non-inverting terminal (e.g., terminal "+") and outputs a signal 548, where the inverting terminal (e.g., terminal "−") and the output terminal of the amplifier 546 are connected together. As an example, the signal 548 is approximately equal (e.g., in magnitude) to the signal 494 (e.g., V1), and in response the voltage on the capacitor 544 becomes approximately equal (e.g., in magnitude) to the signal 548 and thus the signal 494 (e.g., V1).

In another embodiment, if the modulation signal 426 (e.g., PWM) changes to the logic high level and the signal 512 changes to the logic low level, the switch 540 is closed (e.g., being turned on) and the switch 504 is opened (e.g., being turned off). For example, the ramp-current generator 442 outputs the current 438 (e.g., $I_{ramp}$) to charge the capacitor 544 through the closed switch 540. As an example, the ramping signal 428 which corresponds to the voltage on the capacitor 544 increases (e.g., linearly or non-linearly) from a magnitude approximately equal to the signal 494 (e.g., V1) to a maximum magnitude (e.g., the compensation signal 424) as the current 438 charges the capacitor 544.

As discussed above and further emphasized here, FIGS. 4(A), 4(B), 4(C), and 4(D) are merely examples, which should not unduly limit the scope of the claims. One of ordinary skill in the art would recognize many variations, alternatives, and modifications. For example, the ramp-current generator 442 generates the current 438 (e.g., $I_{ramp}$) based at least in part on a multiplication product of (1−D)×D and a difference between the reference signal 436 and the compensation signal 424, so that the compensation signal 424 (e.g., $V_{comp}$) does not vary much at different input voltages to reduce the ripple effects of the compensation signal 424, e.g., as shown in FIG. 5(A).

Figure 5A:
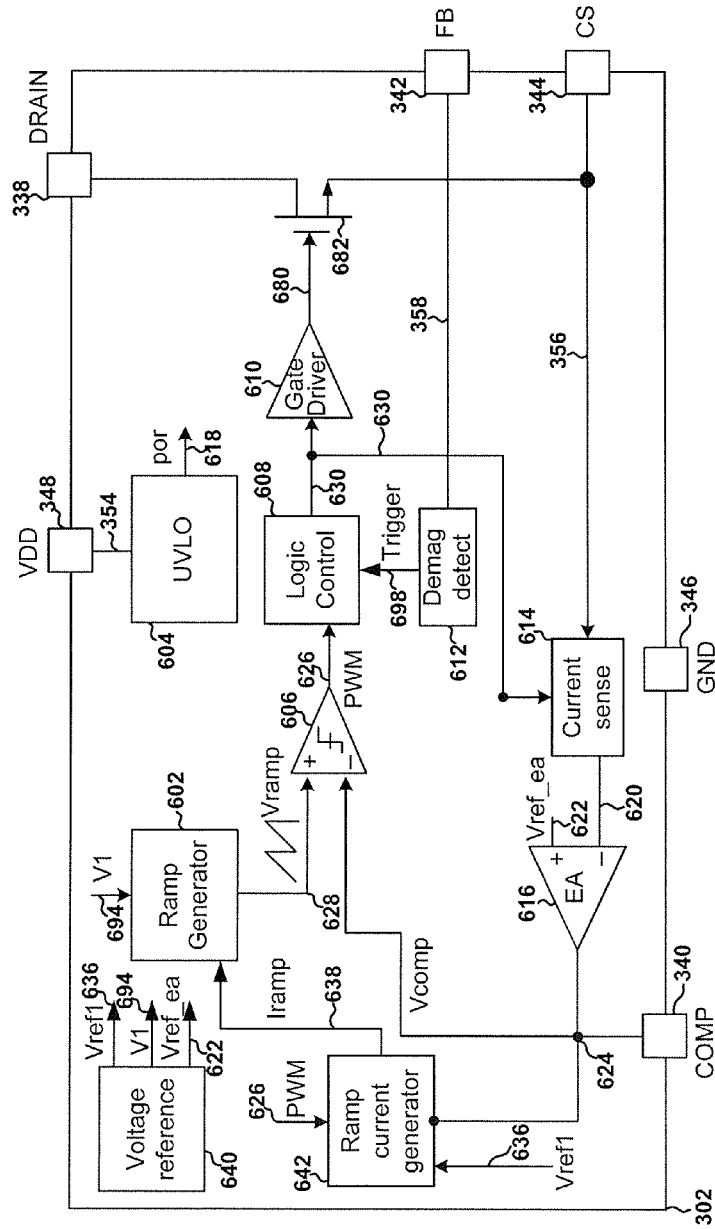
FIG. 5(A) is a simplified diagram showing a system controller as part of the power conversion system as shown in FIG. 3 according to another embodiment of the present invention.

FIG. 5(A) is a simplified diagram showing the system controller 302 as part of the power conversion system 300 according to another embodiment of the present invention. This diagram is merely an example, which should not unduly limit the scope of the claims. One of ordinary skill in the art would recognize many variations, alternatives, and modifications. The system controller 302 includes a ramp-signal generator 602, an under-voltage lock-out (UVLO) component 604 (e.g., a UVLO), a modulation component 606 (e.g., a comparator), a logic controller 608, a driving component 610 (e.g., a gate driver), a demagnetization detector 612, an error amplifier 616, a current-sensing component 614 (e.g., a current sensor), a reference-voltage generator 640, a switch 682 (e.g., a power switch), and a ramp-current generator 642. For example, the switch 682 includes a bipolar junction transistor. In another example, the switch 682 includes a MOS transistor. In yet another example, the switch 682 includes an insulated-gate bipolar transistor (IGBT).

For example, the ramp-signal generator 602, the under-voltage lock-out (UVLO) component 604, the modulation component 606, the logic controller 608, the driving component 610, the demagnetization detector 612, the error amplifier 616, the current-sensing component 614, the reference-voltage generator 640, and the ramp-current generator 642 are the same as the ramp-signal generator 402, the under-voltage lock-out (UVLO) component 404, the modulation component 406, the logic controller 408, the driving component 410, the demagnetization detector 412, the error amplifier 416, the current-sensing component 414, the reference-voltage generator 440, and the ramp-current generator 442, respectively.

According to one embodiment, the UVLO component 604 detects the signal 354 and outputs a signal 618 (e.g., por). For example, if the signal 354 is larger than a first predetermined threshold in magnitude, the system controller 302 begins to operate normally. If the signal 354 is smaller than a second predetermined threshold in magnitude, the system controller 302 is turned off. In another example, the second predetermined threshold is smaller than or equal to the first predetermined threshold in magnitude. In yet another example, the error amplifier 616 receives a signal 620 from the current-sensing component 614 and a reference signal 622, and the compensation signal 624 is provided to the modulation component 606 and the voltage-to-current-conversion component 642. In yet another example, the capacitor 334 is coupled to the terminal 348 and forms, together with the error amplifier 616, an integrator or a low pass filter. In yet another example, the error amplifier 616 is a transconductance amplifier and outputs a current which is proportional to a difference between the reference signal 622 and the signal 620. In yet another example, the error amplifier 616 together with the capacitor 334 generates the compensation signal 624 which is a voltage signal.

According to another embodiment, the reference-voltage generator 640 outputs a reference signal 636 (e.g., $V_{ref}$) to the ramp-current generator 642, outputs a voltage signal 694 (e.g., V1) to the ramp-signal generator 602, and outputs a reference signal 622 (e.g., $V_{ref\_ea}$) to the error amplifier 616. For example, the ramp-signal generator 602 also receives a current signal 638 (e.g., $I_{ramp}$) generated by the ramp-current generator 642 and generates a ramping signal 628. In another example, the current 638 (e.g., $I_{ramp}$) flows from the ramp-current generator 642 to the ramp-signal generator 602. For example, the current 638 (e.g., $I_{ramp}$) flows from the ramp-signal generator 602 to the ramp-current generator 642. In another example, the modulation component 606 receives the ramping signal 628 and outputs a modulation signal 626. In yet another example, the logic controller 608 processes the modulation signal 626 and outputs a control signal 630 to the current-sensing component 614 and the driving component 610. In yet another example, the modulation signal 626 corresponds to a pulse-width-modulation (PWM) signal.

According to yet another embodiment, the current-sensing component 614 samples the current sensing signal 364 in response to the control signal 630 and generates the signal 620. For example, the driving component 610 generates the signal 680 to affect the switch 682. In another example, the switch 682 is coupled between the terminal 338 (e.g., terminal DRAIN) and the terminal 344 (e.g., terminal CS). In yet another example, the switch 682 is closed (e.g., being turned on) and opened (e.g., being turned off) at a switching frequency which corresponds to a switching period, where the switching period includes an on-time period during which the switch 682 is closed (e.g., being turned on) and an off-time period during which the switch 682 is opened (e.g., being turned off). As an example, a duty cycle (e.g., D) of the switch 682 is equal to the duration of the on-time period divided by the duration of the switching period.

As another example, the demagnetization detector 612 detects the feedback signal 358 for determining the beginning and/or the end of the demagnetization process of the inductive component 326. As yet another example, the demagnetization detector 612 outputs a trigger signal 698 to the logic controller 608 to start a next cycle (e.g., corresponding to a next switching period).

To keep the multiplication product of (1−D)×D and the duration of the on-time period (e.g., $T_{on}$) constant, the ramp-current generator 642 generates the current 638 (e.g., $I_{ramp}$) to be proportional in magnitude to (1−D)×D, according to some embodiments. For example, the current 638 (e.g., $I_{ramp}$) is determined as follows:

$$I_{ramp} = k_2 \times (1-D) \times D \quad \text{(Equation 15)}$$

where $k_2$ represents a coefficient parameter. As an example, $k_2$ is proportional to a difference between the reference signal 636 (e.g., $V_{ref}$) and the compensation signal 624 (e.g., $V_{comp}$). In certain embodiments, the current 638 (e.g., $I_{ramp}$) is determined as follows:

$$I_{ramp} = \beta \times (V_{ref} - V_{comp}) \times (1-D) \times D \quad \text{(Equation 16)}$$

where β represents a coefficient parameter (e.g., a constant). In some applications, the compensation signal 624 (e.g., $V_{comp}$), e.g., the output of the error amplifier 616, represents an output load condition for a given input voltage, according to certain embodiments.

In some embodiments, the ramp-current generator 642 generates the current 638 to be approximately proportional in magnitude to (1−D)×D so that the multiplication product of (1−D)×D and the duration of the on-time period (e.g., $T_{on}$) is kept approximately constant. For example, the current 638 (e.g., $I_{ramp}$) is determined as follows:

$$I_{ramp} \cong k_2 \times (1-D) \times D \quad \text{(Equation 17)}$$

where $k_2$ represents a coefficient parameter. As an example, $k_2$ is approximately proportional to a difference between the reference signal 636 (e.g., $V_{ref}$) and the compensation signal 624 (e.g., $V_{comp}$). In certain embodiments, the current 638 (e.g., $I_{ramp}$) is determined as follows:

$$I_{ramp} \cong \beta \times (V_{ref} - V_{comp}) \times (1-D) \times D \quad \text{(Equation 18)}$$

where β represents a coefficient parameter (e.g., a constant). For example, as shown in Equation 18, the error range of the current 638 being proportional in magnitude to a multiplication product of (1−D)×D and the difference between the reference signal 636 and the compensation signal 624 is ±5%. In another example, as shown in Equation 18, the error range of the current 638 being proportional in magnitude to a multiplication product of (1−D)×D and the difference between the reference signal 636 and the compensation signal 624 is ±10%. In yet another example, as shown in Equation 18, the error range of the current 638 being proportional in magnitude to a multiplication product of (1−D)×D and the difference between the reference signal 636 and the compensation signal 624 is ±15%. In yet another example, as shown in Equation 18, the error range of the current 638 being proportional in magnitude to a multiplication product of (1−D)×D and the difference between the reference signal 636 and the compensation signal 624 is ±20%.

As discussed above and further emphasized here, FIG. 5(A) is merely an example, which should not unduly limit the scope of the claims. One of ordinary skill in the art would recognize many variations, alternatives, and modifications. For example, instead of receiving the modulation signal 626, the ramp-current generator 642 receives the signal 680. In another example, instead of receiving the modulation signal 626, the ramp-current generator 642 receives a demagnetization signal generated by the demagnetization detector 612. In yet another example, instead of receiving the modulation signal 626, the ramp-current generator 642 receives a signal complementary to the demagnetization signal. In some embodiments, the system controller 302 is a chip. For example, the switch 682 is on the chip. In another example, the switch 682 is off the chip. In certain embodiments, the switch 682 is connected between the terminal 338 (e.g., terminal DRAIN) and the terminal 344 (e.g., terminal CS), but is located outside the system controller 302.

Figure 5B:
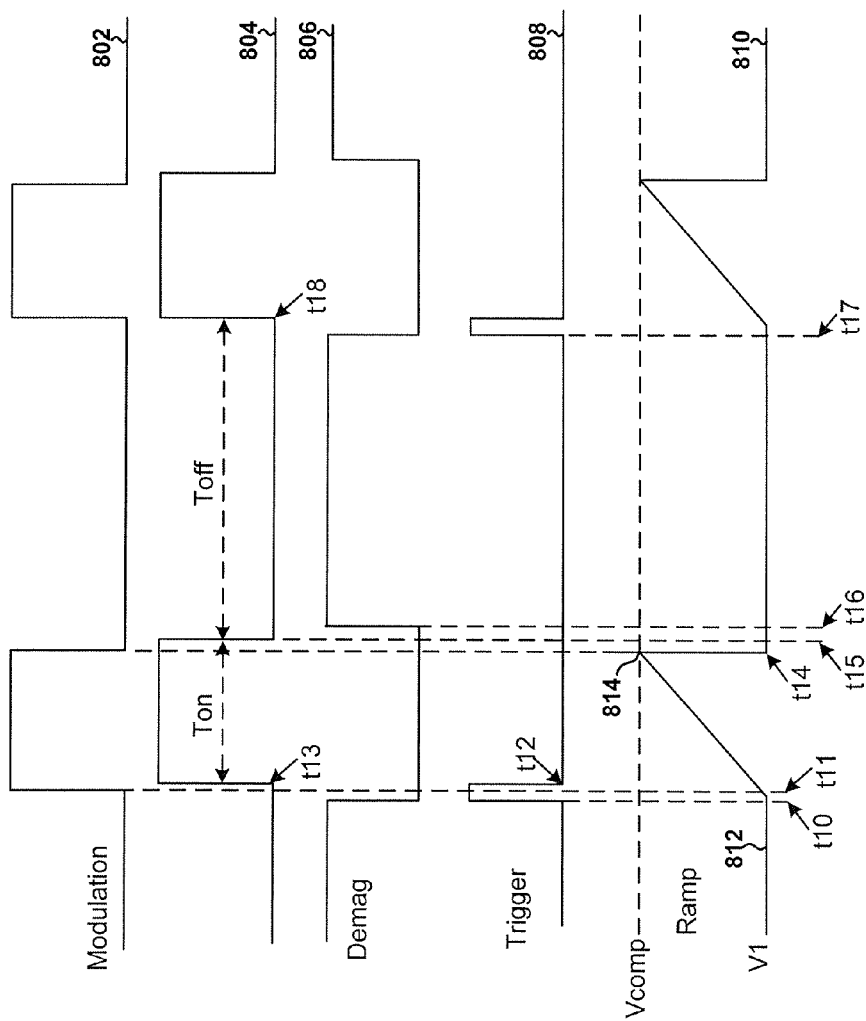
FIG. 5(B) is a simplified timing diagram for a system controller as part of the power conversion system as shown in FIG. 3 according to another embodiment of the present invention.

FIG. 5(B) is a simplified timing diagram for the system controller 302 as part of the power conversion system 300 according to another embodiment of the present invention. This diagram is merely an example, which should not unduly limit the scope of the claims. One of ordinary skill in the art would recognize many variations, alternatives, and modifications. The waveform 802 represents the modulation signal 626 as a function of time, the waveform 804 represents the signal 680 as a function of time, the wave form 806 represents a demagnetization signal generated by the demagnetization detector 612 as a function of time, the waveform 808 represents the trigger signal 698 as a function of time, and the waveform 810 represents the ramping signal 628 as a function of time.

An on-time period and an off-time period associated with the signal 680 are shown in FIG. 5(B). The on-time period begins at a time $t_{13}$ and ends at a time $t_{15}$, and the off-time period begins at the time $t_{15}$ and ends at a time $t_{18}$. For example, $t_{10} < t_{11} < t_{12} < t_{13} < t_{14} < t_{15} < t_{16} < t_{17} < t_{18}$.

According to one embodiment, at $t_{10}$, the demagnetization signal generated by the demagnetization detector 612 changes from the logic low level to the logic high level. For example, the demagnetization detector 612 generates a pulse (e.g., between $t_{10}$ and $t_{12}$) in the trigger signal 698 to trigger a new cycle. As an example, the ramping signal 628 begins to increase from a magnitude 812 to a magnitude 814 (e.g., at $t_{14}$). In another example, at $t_{11}$, the signal 626 changes from the logic low level to the logic high level. After a short delay, the signal 680 changes (e.g., at $t_{13}$) from the logic low level to the logic high level, and in response the switch 682 is closed (e.g., being turned on). In yet another example, at $t_{14}$, the signal 626 changes from the logic high level to the logic low level, and the ramping signal 628 decreases from the magnitude 814 to the magnitude 812. After a short delay, the signal 680 changes (e.g., at $t_{15}$) from the logic high level to the logic low level, and in response, the switch 682 is open (e.g., being turned off).

According to another embodiment, at $t_{16}$, the demagnetization signal generated by the demagnetization detector 612 changes from the logic low level to the logic high level which indicates a beginning of a demagnetization process. For example, at $t_{17}$, the demagnetization signal generated by the demagnetization detector 612 changes from the logic high level to the logic low level which indicates the end of the demagnetization process. In another example, the demagnetization detector 612 generates another pulse in the trigger signal 698 to start a next cycle. In yet another example, the magnitude 812 of the ramping signal 628 is associated with the signal 694. In yet another example, the magnitude 814 of the ramping signal 628 is associated with the magnitude of the compensation signal 624. In yet another example, a ramping slope of the ramp signal 628 is modulated by the compensation signal 624 (e.g., $V_{comp}$), e.g., the output of the error amplifier 616.

According to yet another embodiment, the magnitude change of the ramping signal 628 during the on-time period is determined as follows:

$$\Delta V_{ramp} = V_{comp} - V1 = slp \times T_{on} \qquad \text{(Equation 19)}$$

where $\Delta V_{ramp}$ represents the magnitude changes of the ramping signal 628, $V_{comp}$ represents the compensation signal 624, V1 represents the signal 694, sip represents a ramping slope associated with the ramping signal 628, and $T_{on}$ represents the duration of the on-time period. For example, V1 corresponds to the magnitude 812 of the ramping signal 628. Based on Equation 15, the duration of the on-time period is determined as follows:

$$T_{on} = \frac{V_{comp} - V1}{slp} \qquad \text{(Equation 20)}$$

As shown in Equation 16, for a given compensation signal (e.g., the output of the error amplifier 616), the duration of the on-time period is determined by the ramping slope of the ramping signal 628, according to certain embodiments. For example, a slope of the waveform 810 between $t_{11}$ and $t_{14}$ corresponds to the ramping slope of the ramping signal 628. In some embodiments, the ramping slope of the ramping signal 628 is the same as the ramping slope of the ramping signal 428. In certain embodiments, the ramping slope of the ramping signal 628 is different from the ramping slope of the ramping signal 428.

Figure 5C:
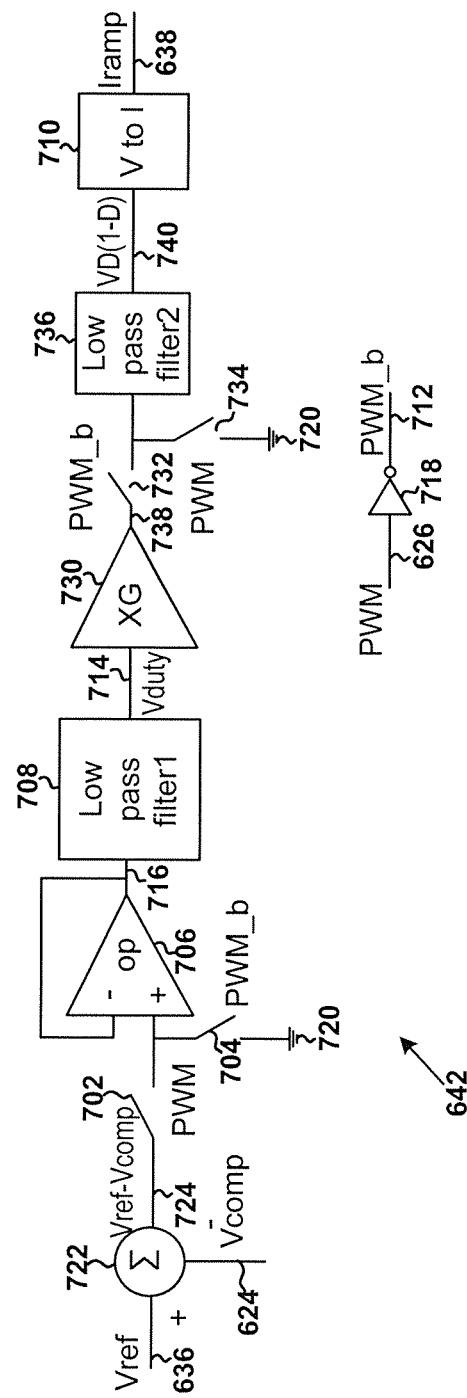
FIG. 5(C) is a simplified diagram showing a ramp-current generator as part of the system controller as shown in FIG. 5(A) according to another embodiment of the present invention.

FIG. 5(C) is a simplified diagram showing the ramp-current generator 642 as part of the system controller 302 according to another embodiment of the present invention. This diagram is merely an example, which should not unduly limit the scope of the claims. One of ordinary skill in the art would recognize many variations, alternatives, and modifications. The ramp-current generator 642 includes an operational amplifier 706, a low pass filter 708, a voltage-to-current converter 710, a NOT gate 718, a summation component 722 (e.g., an adder-subtractor), a gain stage 730 (e.g., an amplifier), another low pass filter 736, and switches 702, 704, 732 and 734.

For example, the operational amplifier 706, the low pass filter 708, the voltage-to-current converter 710, the NOT gate 718, the gain stage 730, the low pass filter 736 and the switches 702, 704, 732 and 734 are the same as the operational amplifier 506, the low pass filter 508, the voltage-to-current converter 510, the NOT gate 518, the gain stage 522, the low pass filter 528, and the switches 502, 504, 524 and 526, respectively. As an example, the low pass filter 708 includes a RC filter which includes one or more resistors and one or more capacitors. As another example, the low pass filter 736 includes a RC filter which includes one or more resistors and one or more capacitors. In some embodiments, the operational amplifier 706 is omitted.

According to one embodiment, the switch 702 is closed or opened in response to the modulation signal 626 (e.g., PWM), and the switch 704 is closed or opened in response to a signal 712 (e.g., PWM_b). For example, the NOT gate 718 generates the signal 712 (e.g., PWM_b) which is complementary to the modulation signal 626 (e.g., PWM). As an example, if the modulation signal 626 is at the logic high level, the signal 712 is at the logic low level, and if the modulation signal 626 is at the logic low level, the signal 712 is at the logic high level. In another example, the summation component 722 receives the reference signal 636 (e.g., $V_{ref}$) and the compensation signal 624 (e.g., $V_{comp}$) and generates a signal 724, where the signal 724 is equal (e.g., in magnitude) to a difference between the reference signal 636 (e.g., $V_{ref}$) and the compensation signal 624 (e.g., $V_{comp}$).

According to another embodiment, if the modulation signal 626 (e.g., PWM) is at the logic high level, the switch 702 is closed (e.g., being turned on) and the operational amplifier 706 receives the signal 724 at its non-inverting terminal (e.g., terminal "+"), where the inverting terminal (e.g., terminal "−") and the output terminal of the amplifier 706 are connected together. As an example, the signal 712 is at the logic low level, and the switch 704 is open (e.g., being turned off). For example, the low pass filter 708 receives a signal 716 from the amplifier 706 and outputs a filtered signal 714 (e.g., $V_{duty}$) that is a voltage signal. In another example, the gain stage 730 (e.g., including an amplifier with a gain of G) receives the filtered signal 714 and generates an amplified signal 738.

According to yet another embodiment, if the modulation signal 626 (e.g., PWM) is at the logic low level and the signal 712 is at the logic high level, the switch 702 is open (e.g., being turned off), and the switch 704 is closed (e.g., being turned on). For example, the operational amplifier 706 receives a ground voltage 720 at its non-inverting terminal (e.g., terminal "+"), and changes the signal 716. As an example, the signal 716 is approximately equal to the ground voltage 720.

In one embodiment, the switch 732 is closed or opened in response to the signal 712 (e.g., PWM_b), and the switch 734 is closed or opened in response to the modulation signal 626 (e.g., PWM). For example, if the modulation signal 626 (e.g., PWM) is at the logic low level, the signal 712 (e.g., PWM_b) is at the logic high level. In response, the switch 732 is closed (e.g., being turned on) and the switch 734 is opened (e.g., being turned off). As an example, the low pass filter 736 receives the amplified signal 738 and outputs a filtered signal 740 (e.g., $V_{D(1-D)}$). As another example, the filtered signal 740 (e.g., $V_{D(1-D)}$) is a voltage signal and is converted by the voltage-to-current converter 710 to the current 638 (e.g., $I_{ramp}$).

Figure 5D:
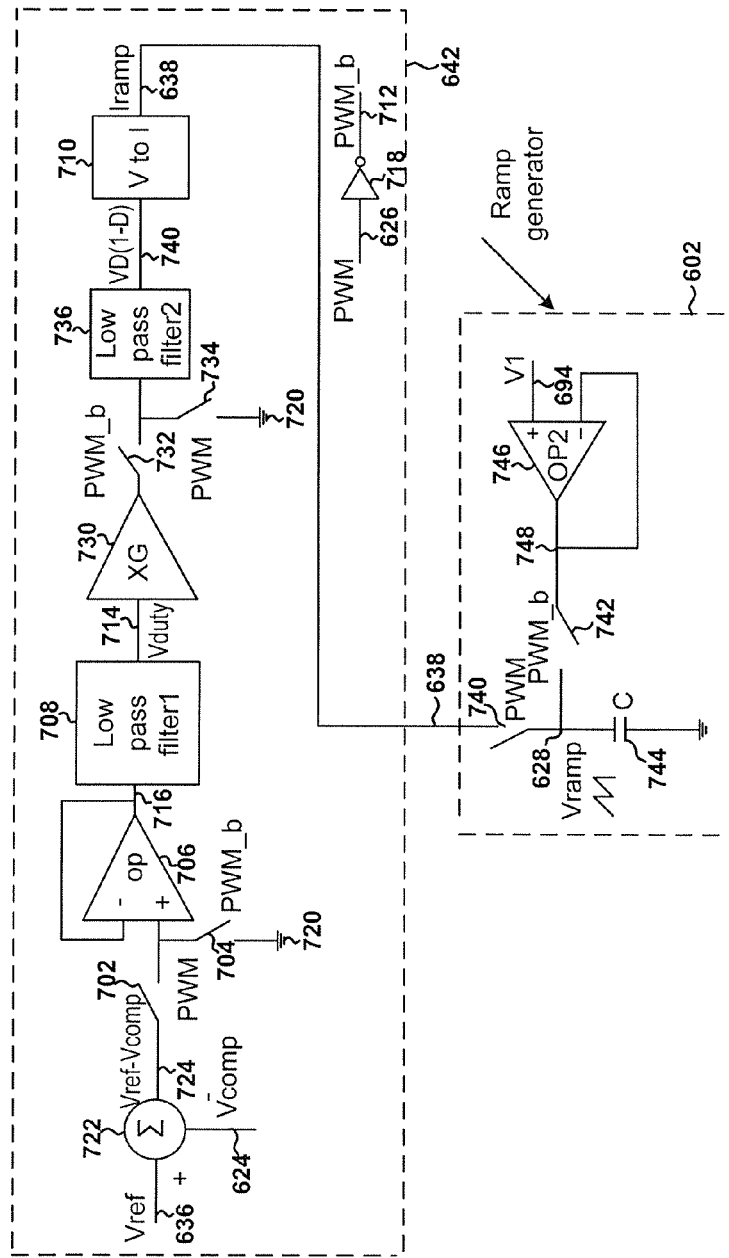
FIG. 5(D) is a simplified diagram showing a ramp-current generator and a ramp-signal generator as parts of the system controller as shown in FIG. 5(A) according to certain embodiments of the present invention.

FIG. 5(D) is a simplified diagram showing the ramp-current generator 642 and the ramp-signal generator 602 as parts of the system controller 302 according to certain embodiments of the present invention. This diagram is merely an example, which should not unduly limit the scope of the claims. One of ordinary skill in the art would recognize many variations, alternatives, and modifications. The ramp-signal generator 602 includes an operational amplifier 746, switches 740 and 742, and a capacitor 744. For example, the switches 702, 704, 732, 734, 740 and 742 each include one or more MOS transistors.

According to one embodiment, the switch 740 is closed or opened in response to the modulation signal 626 (e.g., PWM), and the switch 742 is closed or opened in response to the signal 712 (e.g., PWM_b). In one embodiment, if the modulation signal 626 (e.g., PWM) is at the logic low level and the signal 712 is at the logic high level, the switch 740 is open (e.g., being turned off) and the switch 742 is closed (e.g., being turned on). For example, the operational amplifier 746 receives the signal 694 (e.g., V1) at its non-inverting terminal (e.g., terminal "+") and outputs a signal 748, where the inverting terminal (e.g., terminal "−") and the output terminal of the amplifier 746 are connected together. As an example, the signal 748 is approximately equal (e.g., in magnitude) to the signal 694 (e.g., V1), and in response the voltage on the capacitor 744 becomes approximately equal (e.g., in magnitude) to the signal 748 and thus the signal 694 (e.g., V1).

According to another embodiment, if the modulation signal 626 (e.g., PWM) changes to the logic high level and the signal 712 changes to the logic low level, the switch 740 is closed (e.g., being turned on) and the switch 742 is opened (e.g., being turned off). For example, the ramp-current generator 642 outputs the current 638 to charge the capacitor 744 through the closed switch 740. As an example, the ramping signal 628 which corresponds to the voltage on the capacitor 744 increases (e.g., linearly or non-linearly) from a magnitude approximately equal to the signal 694 (e.g., V1) to a maximum magnitude (e.g., the compensation signal 624) as the current 638 charges the capacitor 744.

According to one embodiment, a system controller includes: a driver configured to output a drive signal to a switch to affect a current flowing through an inductive winding of a power converter, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. One minus the duty cycle is equal to a parameter. The system controller is configured to keep a multiplication product of the duty cycle, the parameter and the duration of the on-time period approximately constant. For example, the system controller is implemented according to at least FIG. 3, FIG. 4(A), FIG. 4(B), FIG. 4(C), and/or FIG. 4(D).

According to another embodiment, a system controller for regulating a power conversion system includes: a ramp-current generator configured to receive a modulation signal and generate a ramp current based at least in part on the modulation signal; a ramp-signal generator configured to receive the ramp current and generate a ramping signal based at least in part on the ramp current; a modulation component configured to receive the ramping signal and generate the modulation signal based at least in part on the ramping signal; and a driver configured to generate a drive signal based on at least information associated with the modulation signal and output the drive signal to a switch to affect a first current flowing through an inductive winding of a power converter, the drive signal being associated with a switching period including an on-time period and an off-time period. The switch is closed in response to the drive signal during the on-time period, and the switch is opened in response to the drive signal during the off-time period. A duty cycle is equal to a duration of the on-time period divided by a duration of the switching period. One minus the duty cycle is equal to a parameter. The ramp-current generator is further configured to generate the ramp current approximately proportional in magnitude to a multiplication product of the duty cycle and the parameter. For example, the system controller is implemented according to at least FIG. 3, FIG. 4(A), FIG. 4(B), FIG. 4(C), and/or FIG. 4(D).

According to yet another embodiment, a system controller for regulating a power conversion system includes: a first controller terminal configured to provide a compensation signal based on at least information associated with a first current flowing through an inductive winding of a power converter; a ramp-current generator configured to receive a modulation signal, the compensation signal and a first reference signal and generate a ramp current based at least in part on the modulation signal, the compensation signal and the first reference signal; a ramp-signal generator configured to receive the ramp current and generate a ramping signal based at least in part on the ramp current; a modulation component configured to receive the ramping signal and the compensation signal and generate the modulation signal based at least in part on the ramping signal and the compensation signal; and a driver configured to generate a drive signal based on at least information associated with the modulation signal and output the drive signal to a switch to affect the first current, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. One minus the duty cycle is equal to a parameter. The ramp-current generator is further configured to generate the ramp current approximately proportional in magnitude to a multiplication product of the duty cycle, the parameter and a difference, the difference representing the first reference signal minus the compensation signal in magnitude. For example, the system controller is implemented according to at least FIG. 3, FIG. 5(A), FIG. 5(B), FIG. 5(C), and/or FIG. 5(D).

In one embodiment, a method for regulating a power conversion system includes: generating a drive signal associated with a switching period including an on-time period and an off-time period; and outputting the drive signal to a switch to affect a current flowing through an inductive component. The outputting the drive signal to the switch to affect the current includes: outputting the drive signal to close the switch during the on-time period; and outputting the drive signal to open the switch during the off-time period. A duty cycle is equal to a duration of the on-time period divided by a duration of the switching period. One minus the duty cycle is equal to a parameter. The generating the drive signal associated with the switching period includes keeping a multiplication product of the duty cycle, the parameter and the duration of the on-time period approximately constant. For example, the method is implemented according to at least FIG. 3, FIG. 4(A), FIG. 4(B), FIG. 4(C), and/or FIG. 4(D).

In another embodiment, a method for regulating a power conversion system includes: receiving a modulation signal; generating a ramp current based at least in part on the modulation signal; receiving the ramp current; generating a ramping signal based at least in part on the ramp current; receiving the ramping signal; generating the modulation signal based at least in part on the ramping signal; receiving the modulation signal; generating a drive signal based at least in part on the modulation signal, the drive signal being associated with a switching period including an on-time period and an off-time period; and outputting the drive signal to a switch to affect a first current flowing through a primary winding of a power conversion system. The outputting the drive signal to the switch to affect the first current includes: outputting the drive signal to close the switch during the on-time period; and outputting the drive signal to open the switch during the off-time period. A duty cycle is equal to a duration of the on-time period divided by a duration of the switching period. A parameter is equal to one minus the duty cycle. The generating the ramp current based at least in part on the modulation signal includes generating the ramp current approximately proportional in magnitude to a multiplication product of the duty cycle and the parameter. For example, the method is implemented according to at least FIG. 3, FIG. 4(A), FIG. 4(B), FIG. 4(C), and/or FIG. 4(D).

In yet another embodiment, a method for regulating a power conversion system includes: providing a compensation signal based on at least information associated with a first current flowing through a primary winding of a power conversion system; receiving a modulation signal, the compensation signal and a first reference signal; generating a ramp current based at least in part on the modulation signal, the compensation signal and the first reference signal; receiving the ramp current; generating a ramping signal based at least in part on the ramp current; receiving the ramping signal and the compensation signal; generating the modulation signal based at least in part on the ramping signal and the compensation signal; receiving the modulation signal; and outputting a drive signal to a switch to affect the first current, the drive signal being associated with a switching period including an on-time period and an off-time period. The outputting the drive signal to the switch to affect the first current includes: outputting the drive signal to close the switch during the on-time period; and outputting the drive signal to open the switch during the off-time period. A duty cycle is equal to a duration of the on-time period divided by a duration of the switching period. A parameter is equal to one minus the duty cycle. The generating the ramp current based at least in part on the modulation signal, the compensation signal and the first reference signal includes generating the ramp current approximately proportional in magnitude to a multiplication product of the duty cycle, the parameter and a difference, the different representing the first reference signal minus the compensation signal in magnitude. For example, the method is implemented according to at least FIG. 3, FIG. 5(A), FIG. 5(B), FIG. 5(C), and/or FIG. 5(D).

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power converter, the system controller comprising:
    a driver configured to output a drive signal to a switch to affect a current flowing through an inductive winding of a power converter, the drive signal being associated with a switching period including an on-time period and an off-time period;
    wherein:
        the switch is closed in response to the drive signal during the on-time period;
        the switch is opened in response to the drive signal during the off-time period;
        a duty cycle is equal to a duration of the on-time period divided by a duration of the switching period; and
        one minus the duty cycle is equal to a parameter;
    wherein the system controller is configured to keep a multiplication product of the duty cycle, the parameter and the duration of the on-time period approximately constant;
    wherein the system controller is further configured to keep a multiplication product of the duty cycle, the parameter and the duration of the on-time period constant.

2. A system controller for regulating a power converter, the system controller comprising:
    a driver configured to output a drive signal to a switch to affect a current flowing through an inductive winding of a power converter, the drive signal being associated with a switching period including an on-time period and an off-time period; and a controller terminal configured to receive a first signal related to an input signal of the power converter;
wherein:
the switch is closed in response to the drive signal during the on-time period;
the switch is opened in response to the drive signal during the off-time period;
a duty cycle is equal to a duration of the on-time period divided by a duration of the switching period; and
one minus the duty cycle is equal to a parameter;
wherein the system controller is configured to keep a multiplication product of the duty cycle, the parameter and the duration of the on-time period approximately constant;
wherein the system controller is configured to keep a multiplication product of the duty cycle, the parameter and the duration of the on-time period approximately constant so that an average of the current during one or more switching periods increases in magnitude with the increasing input signal over time and decreases in magnitude with the decreasing input signal over time.

3. A system controller for regulating a power converter, the system controller comprising:
a driver configured to output a drive signal to a switch to affect a current flowing through an inductive winding of a power converter, the drive signal being associated with a switching period including an on-time period and an off-time period; and
a controller terminal configured to receive a first signal related to an input signal of the power converter;
wherein:
the switch is closed in response to the drive signal during the on-time period;
the switch is opened in response to the drive signal during the off-time period;
a duty cycle is equal to a duration of the on-time period divided by a duration of the switching period; and
one minus the duty cycle is equal to a parameter;
wherein the system controller is configured to keep a multiplication product of the duty cycle, the parameter and the duration of the on-time period approximately constant;
wherein:
the input signal changes over time along a first waveform; and
the average of the current changes over time along a second waveform similar to the first waveform.

4. A system controller for regulating a power converter, the system controller comprising:
a driver configured to output a drive signal to a switch to affect a current flowing through an inductive winding of a power converter, the drive signal being associated with a switching period including an on-time period and an off-time period;
a ramp-current generator configured to receive a modulation signal and generate a ramp current based at least in part on the modulation signal;
a ramp-signal generator configured to receive the ramp current and generate a ramping signal based at least in part on the ramp current;
a modulation component configured to receive the ramping signal and generate the modulation signal based at least in part on the ramping signal; and
a logic controller configured to receive the modulation signal and generate a control signal based at least in part on the modulation signal;
wherein:
the switch is closed in response to the drive signal during the on-time period;
the switch is opened in response to the drive signal during the off-time period;
a duty cycle is equal to a duration of the on-time period divided by a duration of the switching period; and
one minus the duty cycle is equal to a parameter;
wherein the system controller is configured to keep a multiplication product of the duty cycle, the parameter and the duration of the on-time period approximately constant;
wherein the driver is further configured to generate the drive signal based at least in part on the control signal.

5. The system controller of claim 4 wherein the ramp-current generator includes:
a first low pass filter configured to generate a first filtered signal based on at least information associated with the modulation signal;
a gain stage configured to receive the first filtered signal and generate a first amplified signal based at least in part on the first filtered signal;
a second low pass filter configured to receive the first amplified signal and generate a second filtered signal based at least in part on the first amplified signal; and
a voltage-to-current converter configured to receive the second filtered signal and generate the ramp current based at least in part on the second filtered signal.

6. The system controller of claim 5 wherein:
the ramp-current generator further includes an amplifier configured to receive the modulation signal and generate a second amplified signal based at least in part on the modulation signal; and
the first low pass filter is further configured to receive the second amplified signal and generate the first filtered signal based at least in part on the second amplified signal.

7. The system controller of claim 6 wherein the amplifier is further configured to:
in response to the modulation signal being at a first logic level, receive a reference signal and generate the second amplified signal based at least in part on the reference signal; and
in response to the modulation signal being at a second logic level, receive a ground voltage and generate the second amplified signal based at least in part on the ground voltage.

8. The system controller of claim 7 wherein the ramp-current generator further includes:
a first switch coupled to the amplifier and configured to be closed to pass the reference signal in response to the modulation signal being at the first logic level; and
a second switch coupled to the amplifier and configured to be closed to pass the ground voltage in response to the modulation signal being at the second logic level.

9. The system controller of claim 4 wherein the ramp-signal generator includes: a capacitor configured to:
in response to the modulation signal being at a first logic level, generate the ramping signal based at least in part on the ramp current; and
in response to the modulation signal being at a second logic level, generate the ramping signal based at least in part on a second signal.

10. The system controller of claim 9 wherein the ramp-signal generator further includes: an amplifier configured to receive a reference signal and generate the second signal based at least in part on the reference signal.

11. The system controller of claim 9, further comprising:
a first switch coupled to the capacitor and configured to be closed to pass the ramp current in response to the modulation signal being at the first logic level; and
a second switch coupled to the capacitor and configured to be closed to pass the second signal in response to the modulation signal being at the second logic level.

12. The system controller of claim 4, further comprising:
a demagnetization detector configured to receive a feedback signal associated with an output signal of the power conversion system and generate a trigger signal based at least in part on the feedback signal, the trigger signal indicating an end of a demagnetization process of the power conversion system;
wherein the logic controller is further configured to receive the trigger signal and generate a second signal based at least in part on the trigger signal to affect the drive signal.

13. The system controller of claim 12, further comprising:
an error amplifier configured to receive a reference signal and generate a third signal based at least in part on the reference signal.

14. The system controller of claim 13, further comprising:
a current sensing component configured to receive the current sensing signal and generate a fourth signal based at least in part on the current sensing signal.

15. The system controller of claim 13 wherein:
the error amplifier is further configured to generate the third signal to charge or discharge a capacitor to generate a compensation signal; and
the modulation component is further configured to receive the compensation signal and generate the modulation signal based at least in part on the compensation signal and the ramping signal.

16. The system controller of claim 4 wherein the ramping signal increases in magnitude at a ramping slope during the on-time period.

17. A system controller for regulating a power converter, the system controller comprising:
a driver configured to output a drive signal to a switch to affect a current flowing through an inductive winding of a power converter, the drive signal being associated with a switching period including an on-time period and an off-time period;
a first controller terminal configured to receive a first signal related to an input signal of the power converter; and
a second controller terminal configured to receive a current sensing signal associated with the current flowing through the inductive winding;
wherein:
the switch is closed in response to the drive signal during the on-time period;
the switch is opened in response to the drive signal during the off-time period;
a duty cycle is equal to a duration of the on-time period divided by a duration of the switching period; and
one minus the duty cycle is equal to a parameter;
wherein the system controller is configured to keep a multiplication product of the duty cycle, the parameter and the duration of the on-time period approximately constant;
wherein the switch is connected between the first controller terminal and the second controller terminal.

18. A system controller for regulating a power conversion system, the system controller comprising:
a ramp-current generator configured to receive a modulation signal and generate a ramp current based at least in part on the modulation signal;
a ramp-signal generator configured to receive the ramp current and generate a ramping signal based at least in part on the ramp current;
a modulation component configured to receive the ramping signal and generate the modulation signal based at least in part on the ramping signal; and
a driver configured to generate a drive signal based on at least information associated with the modulation signal and output the drive signal to a switch to affect a first current flowing through an inductive winding of a power converter, the drive signal being associated with a switching period including an on-time period and an off-time period;
wherein:
the switch is closed in response to the drive signal during the on-time period;
the switch is opened in response to the drive signal during the off-time period;
a duty cycle is equal to a duration of the on-time period divided by a duration of the switching period; and
one minus the duty cycle is equal to a parameter;
wherein the ramp-current generator is further configured to generate the ramp current approximately proportional in magnitude to a multiplication product of the duty cycle and the parameter.

19. The system controller of claim 18 is configured to keep a multiplication product of the duty cycle, the parameter and the duration of the on-time period approximately constant in response to the ramp current being approximately proportional in magnitude to the multiplication product of the duty cycle and the parameter.

20. The system controller of claim 18 wherein the ramp-current generator is further configured to generate the ramp current proportional in magnitude to the multiplication product of the duty cycle and the parameter.

21. The system controller of claim 20 is configured to keep a multiplication product of the duty cycle, the parameter and the duration of the on-time period constant in response to the ramp current being proportional in magnitude to the multiplication product of the duty cycle and the parameter.

22. The system controller of claim 18 wherein the ramp-current generator includes:
a first low pass filter configured to generate a first filtered signal based on at least information associated with the modulation signal;
a gain stage configured to receive the first filtered signal and generate a first amplified signal based at least in part on the first filtered signal;
a second low pass filter configured to receive the first amplified signal and generate a second filtered signal based at least in part on the first amplified signal; and
a voltage-to-current converter configured to receive the second filtered signal and generate the ramp current based at least in part on the second filtered signal.

23. The system controller of claim 22 wherein:
the ramp-current generator further includes an amplifier configured to receive the modulation signal and generate a second amplified signal based at least in part on the modulation signal; and
the first low pass filter is further configured to receive the second amplified signal and generate the first filtered signal based at least in part on the second amplified signal.

24. The system controller of claim 23 wherein the amplifier is further configured to:
  in response to the modulation signal being at a first logic level, receive a reference signal and generate the second amplified signal based at least in part on the reference signal; and
  in response to the modulation signal being at a second logic level, receive a ground voltage and generate the second amplified signal based at least in part on the ground voltage.

25. The system controller of claim 24 wherein the ramp-current generator further includes:
  a first switch coupled to the amplifier and configured to be closed to pass the reference signal in response to the modulation signal being at the first logic level; and
  a second switch coupled to the amplifier and configured to be closed to pass the ground voltage in response to the modulation signal being at the second logic level.

26. The system controller of claim 18 wherein the ramp-signal generator includes a capacitor configured to:
  in response to the modulation signal being at a first logic level, generate the ramping signal based at least in part on the ramp current; and
  in response to the modulation signal being at a second logic level, generate the ramping signal based at least in part on a second signal.

27. The system controller of claim 26 wherein the ramp-signal generator further includes an amplifier configured to receive a reference signal and generate the second signal based at least in part on the reference signal.

28. The system controller of claim 26, further comprising:
  a first switch coupled to the capacitor and configured to be closed to pass the ramp current in response to the modulation signal being at the first logic level; and
  a second switch coupled to the capacitor and configured to be closed to pass the second signal in response to the modulation signal being at the second logic level.

29. The system controller of claim 18, further comprising:
  a demagnetization detector configured to receive a feedback signal associated with an output signal of the power converter and generate a trigger signal based at least in part on the feedback signal, the trigger signal indicating an end of a demagnetization process of the power conversion system; and
  a logic controller configured to receive the trigger signal and generate a second signal based at least in part on the trigger signal to affect the drive signal.

30. The system controller of claim 29, further comprising:
  an error amplifier configured to receive a reference signal and generate a third signal based at least in part on the reference signal.

31. The system controller of claim 30, further comprising:
  a current sensing component configured to receive a current sensing signal associated with the first current and generate a fourth signal based at least in part on the current sensing signal.

32. The system controller of claim 30 wherein:
  the error amplifier is further configured to generate the third signal to charge a capacitor to generate a compensation signal; and
  the modulation component is further configured to receive the compensation signal and generate the modulation signal based at least in part on the compensation signal and the ramping signal.

33. The system controller of claim 18 wherein the ramping signal increases in magnitude at a ramping slope during the on-time period.

34. The system controller of claim 18, further comprising:
  a first controller terminal configured to receive a first signal related to an input signal of the power converter; and
  a second controller terminal configured to receive a current sensing signal associated with the first current flowing through the inductive winding;
  wherein the switch is connected between the first controller terminal and the second controller terminal.

35. A method for regulating a power conversion system, the method comprising:
  generating a drive signal associated with a switching period including an on-time period and an off-time period; and
  outputting the drive signal to a switch to affect a current flowing through an inductive component;
  wherein the outputting the drive signal to the switch to affect the current includes:
    outputting the drive signal to close the switch during the on-time period; and
    outputting the drive signal to open the switch during the off-time period;
  wherein:
    a duty cycle is equal to a duration of the on-time period divided by a duration of the switching period; and
    one minus the duty cycle is equal to a parameter;
  wherein the generating the drive signal associated with the switching period includes keeping a multiplication product of the duty cycle, the parameter and the duration of the on-time period approximately constant;
  wherein the keeping the multiplication product of the duty cycle, the parameter and the duration of the on-time period approximately constant includes keeping the multiplication product of the duty cycle, the parameter and the duration of the on-time period constant.

36. A method for regulating a power conversion system, the method comprising:
  receiving a modulation signal;
  generating a ramp current based at least in part on the modulation signal;
  receiving the ramp current;
  generating a ramping signal based at least in part on the ramp current;
  receiving the ramping signal;
  generating the modulation signal based at least in part on the ramping signal;
  receiving the modulation signal;
  generating a drive signal based at least in part on the modulation signal, the drive signal being associated with a switching period including an on-time period and an off-time period; and
  outputting the drive signal to a switch to affect a first current flowing through a primary winding of a power conversion system;
  wherein the outputting the drive signal to the switch to affect the first current includes:
    outputting the drive signal to close the switch during the on-time period; and
    outputting the drive signal to open the switch during the off-time period;
  wherein:
    a duty cycle is equal to a duration of the on-time period divided by a duration of the switching period; and
    a parameter is equal to one minus the duty cycle;
  wherein the generating the ramp current based at least in part on the modulation signal includes generating the ramp current approximately proportional in magnitude to a multiplication product of the duty cycle and the parameter.

37. The method of claim 36 wherein the generating the ramp current approximately proportional in magnitude to a multiplication product of the duty cycle and the parameter includes generating the ramp current proportional in magnitude to the multiplication product of the duty cycle and the parameter.

* * * * *